(12) United States Patent
Hirschman

(10) Patent No.: US 8,972,617 B2
(45) Date of Patent: Mar. 3, 2015

(54) MULTI-CONFIGURATION COMPUTER

(75) Inventor: Jonathan Hirschman, Brooklyn, NY (US)

(73) Assignee: Pieco, Brooklyn, NY (US)

( * ) Notice: Subject to any disclaimer, the term of this patent is extended or adjusted under 35 U.S.C. 154(b) by 94 days.

(21) Appl. No.: 13/445,408

(22) Filed: Apr. 12, 2012

(65) Prior Publication Data

US 2012/0271967 A1    Oct. 25, 2012

Related U.S. Application Data

(60) Provisional application No. 61/477,387, filed on Apr. 20, 2011.

(51) Int. Cl.
| G06F 3/00 | (2006.01) |
| G06F 3/02 | (2006.01) |
| A63F 9/24 | (2006.01) |
| G06F 3/023 | (2006.01) |
| G06F 3/02 | (2006.01) |
| H01R 13/627 | (2006.01) |

(52) U.S. Cl.
CPC .............. *G06F 3/023* (2013.01); *G06F 3/0219* (2013.01); *G06F 3/0227* (2013.01); *H01R 13/6277* (2013.01); *H01R 2201/06* (2013.01)
USPC .................................................. 710/8; 463/37

(58) Field of Classification Search
None
See application file for complete search history.

(56) References Cited

U.S. PATENT DOCUMENTS

| 5,202,817 | A | 4/1993 | Koenck |
| 6,286,060 | B1 | 9/2001 | DiGiorgio |
| 6,426,868 | B1 | 7/2002 | Fullerton |
| 6,490,155 | B2 | 12/2002 | Han |
| 6,747,578 | B1 | 6/2004 | Lam |
| 7,618,260 | B2 | 11/2009 | Daniel |
| 7,652,660 | B2 | 1/2010 | Chen |
| 2002/0186525 | A1 | 12/2002 | Singh |
| 2006/0286943 | A1* | 12/2006 | Vance et al. ................. 455/90.1 |
| 2009/0198852 | A1 | 8/2009 | Rofougaran |
| 2009/0291760 | A1* | 11/2009 | Hepburn et al. ................ 463/37 |
| 2010/0081505 | A1 | 4/2010 | Alten |
| 2011/0320405 | A1 | 12/2011 | Hsu |

FOREIGN PATENT DOCUMENTS

| CN | 1979386 | 6/2007 |
| KR | 20020091387 | 12/2002 |

(Continued)

OTHER PUBLICATIONS

English Language Abstact of CN 1979386 published on Jun. 13, 2007.

(Continued)

*Primary Examiner* — Hyun Nam
(74) *Attorney, Agent, or Firm* — DLA Piper LLP (US)

(57) ABSTRACT

A method for configuring computer operational parameters comprising detecting with at least one processor at least one peripheral device in communication with the at least one processor; receiving, with the at least one processor from at least one of a plurality of communication ports constructed and arranged to interface with the at least one peripheral device, data about the at least one peripheral device, the data comprising at least one location of the at least one peripheral device; identifying with the at least one processor at least one profile associated with the peripheral device data; and adjusting at least one operational parameter based on the at least one profile.

36 Claims, 40 Drawing Sheets

(56) References Cited

FOREIGN PATENT DOCUMENTS

| RU | 2347275 | 2/2009 |
|---|---|---|
| WO | WO 00/55704 | 9/2000 |

OTHER PUBLICATIONS http://www.motorola.com/consumers/us-en/consumer-product-and-services/mobile-phones/motorola-atrix-us-en electronically captured for Mar. 20, 2011 on Wayback.com.

http://promos.asus.corn/us/pr_2011/Transformer/index.html.

http://promos.asus.com/us/pr_2011/Transformer/index.html; Mar. 25, 2011.

International Search Report and Written Opinion issued in PCT/US2012/033271 on Jul. 12, 2012.

English Language Abstract of KR 2002-0091387 published Dec. 6, 2002.

International Preliminary Report on Patentability and Written Opinion issued in PCT/US2012/033271 on Oct. 31, 2013.

* cited by examiner

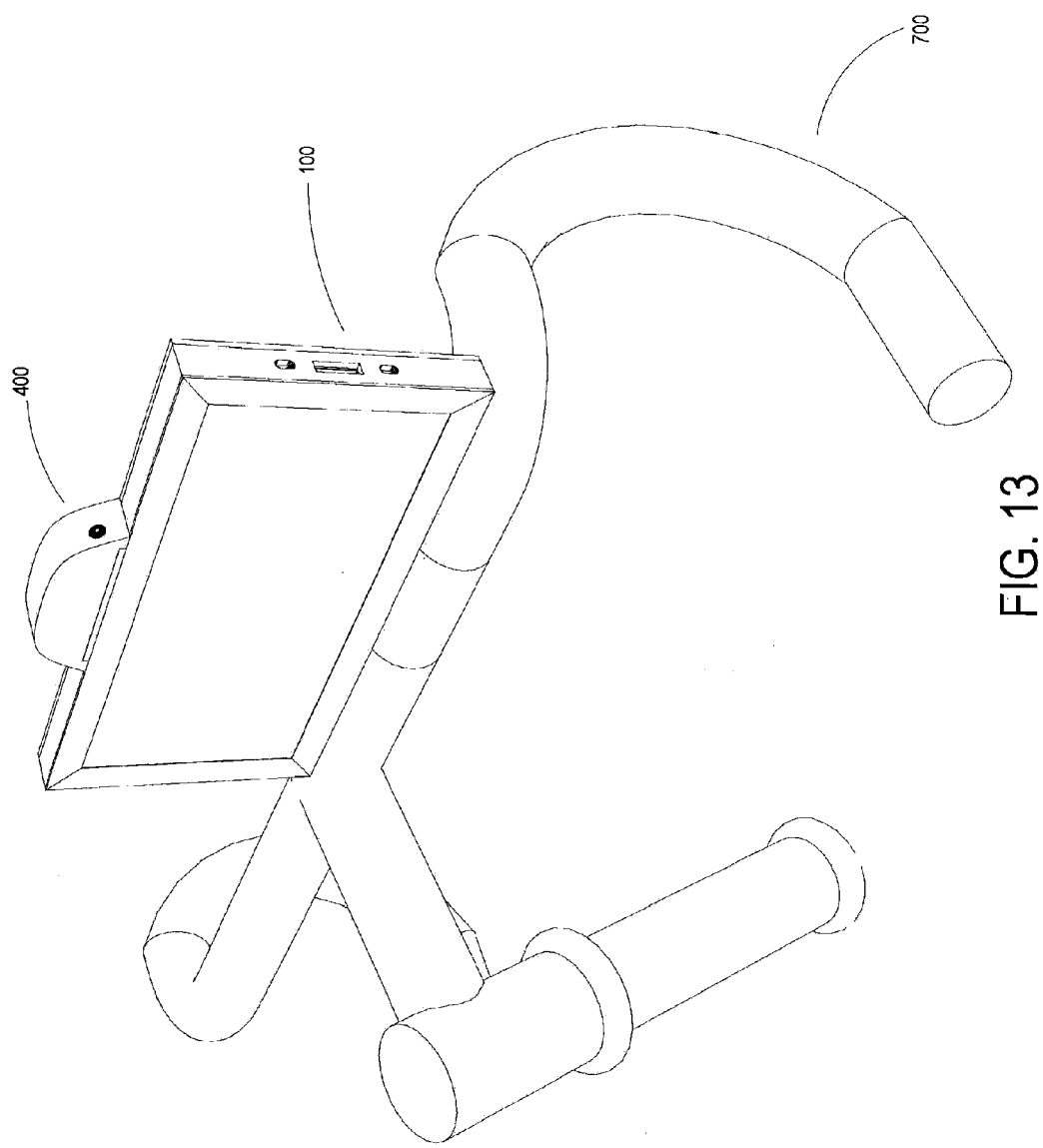

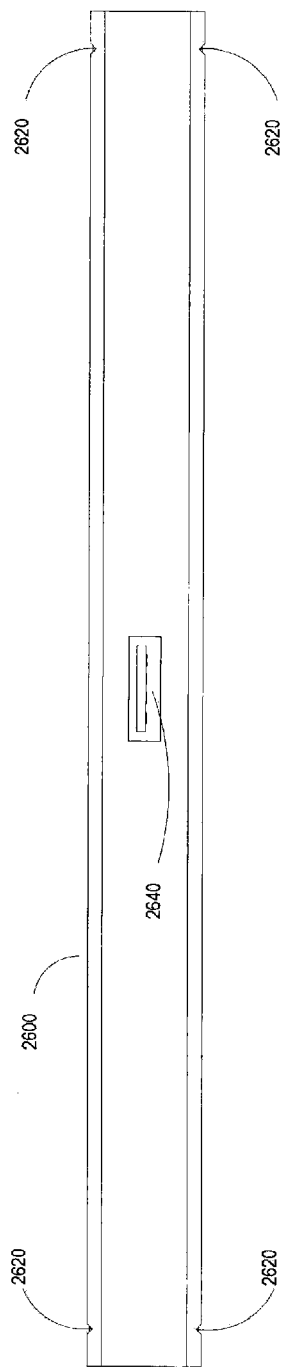
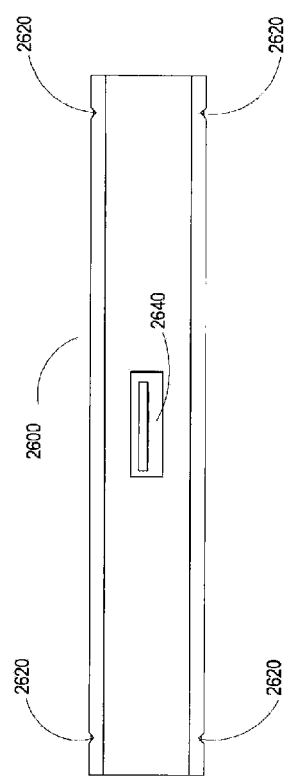
FIG. 19D
FIG. 19E

MULTI-CONFIGURATION COMPUTER

CROSS-REFERENCE TO RELATED APPLICATIONS

This application is based on and derives the benefit of the filing date of U.S. Provisional Patent Application No. 61/477,387, filed Apr. 20, 2011. The entire content of this application is herein incorporated by reference in its entirety.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 13 illustrates a portable computer system integrally attached to a vehicle mount accessory and a swiveling camera accessory, with the swiveling camera fully rotated to front-facing mode, according to an embodiment of the present invention.

FIG. 19D is a side view of a portable computer system, according to an embodiment of the present invention.

FIG. 19E is a side view of a portable computer system, according to an embodiment of the present invention.

DETAILED DESCRIPTION

Figure 1:
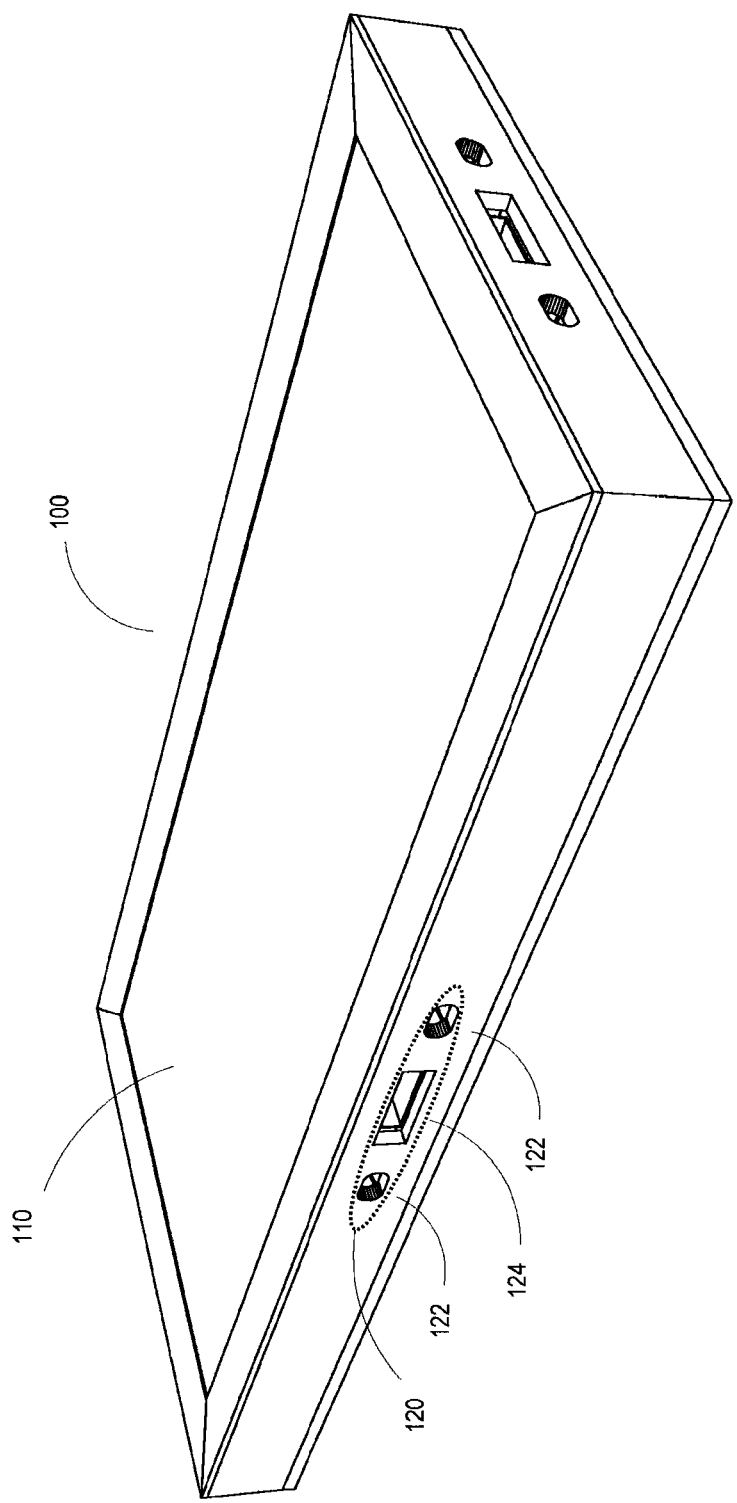
FIG. 1 is a front angled perspective view of a portable computer system, according to an embodiment of the present invention.

Methods and apparatuses for producing and operating a portable computer device based on a standardized system allowing for the portable device to receive a plethora of accessories or peripherals are described. According to certain embodiments, an array of industry-standard electronic expansion busses may be combined with proprietary retention devices for use with a portable computer system, such as, for example, a laptop computer, a tablet computing device, a cellular phone, etc. The computer system may detect the insertion of one or more accessories or peripherals and determine a combined device profile. The profile may be based on accessory or peripheral identification and physical location relative to the computing system, and may be provided to a software component executed within the portable device. In response to the detection of the combined device profile, the software component may alter hardware operating parameters, including but not limited to CPU clock speed, display mode and orientation, audio circuit enablement/disablement, software application loading/unloading, etc., in accordance with a user's saved settings, settings created by other software applications, settings stored in the accessories themselves, or other settings.

In the following description, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the descriptions which follow are presented in terms of algorithms and symbolic representations of operations on data bits within a computer memory. These algorithmic descriptions and representations may be used by those skilled in the data processing arts to convey the substance of their work to others skilled in the art. An algorithm is here, and generally, conceived to be a self-consistent sequence of steps leading to a desired result. The steps may involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the required method steps. Structures for a variety of these systems may appear from the description below. In addition, the present invention is not described with reference to any particular programming language. It will be appreciated that a variety of programming languages may be used to implement the teachings of the invention as described herein.

Various software applications may be executed on portable computer systems. Such applications may include, but are not limited to, video games, word processing programs, electronic spreadsheets, drawing and painting programs, etc. Some portable computer systems may include touchscreens that may cover a majority or significant portion of one side of the device. These touchscreens may display an interface to a running software application, such as the action of a video game, or the contents of a document, etc. A user may input commands and instructions to the software application by touching, tapping or otherwise manipulating portions of the touchscreen. In addition to or in place of a touchscreen interface, embodiments of the present invention may provide a system for adding accessories that may be received by a portable computer device and that may provide control inputs that may be manipulated by a user.

In various embodiments of the present invention, a portable computer system containing a combination of communication and/or retention ports may allow a user to employ standard accessories that have a matching communications connector in a fashion that they may be presently accustomed to, for example, inserting or attaching a USB standard "memory stick" into a computing device to enable transfer of data between the memory stick and the computer system, while conferring additional functions for accessories that contain a matching combination of both retention posts and communications connectors. For example, in an embodiment of the present invention, the retention elements, constructed of electrically conductive material, may be employed by the portable computer system to provide electrical power to an accessory, for an accessory to provide electrical power to the portable computer system, or both. Also, in an embodiment of the present invention, the retention elements may be employed for electronic signaling, providing an auxiliary communications channel between the portable computer system and the accessory. Such signaling may be employed for receiving or transmitting user preferences for the accessory in general or for the use of the accessory in conjunction with a particular software application. The signaling may also allow communication of authentication codes to insure authenticity or a specific manufacturing source for an accessory or portable computer system.

FIG. 1 is a front angled perspective view of a portable computer system, according to an embodiment of the present invention. This figure, as with other included figures, is shown for illustrative purposes only and does not limit the possible embodiments of the present invention. In this example, a portable computer system 100 may include a touch screen display 110 able to register contact between the screen and a pointing device, such as a finger, stylus, etc. A port group 120 may also be included. According to an embodiment of the present invention, port groups 120 may be present on each of four sides of portable computer system 100. In other embodiments, port groups 120 may be included on fewer sides, or on the front or back of the computer system 100. According to an embodiment of the present invention, the port group 120 may be composed of two retention ports 122 and one communications port 124, but could be composed of any number of each type of port. In one embodiment of the present invention communications port 124 may be a USB 2.0 port, but could alternatively be any of a number of well-known communications standards and protocols such as, e.g., parallel, SCSI (small communications system interface), Firewire (IEEE 1394), Ethernet, HDMI, etc. In some embodiments of the invention, multiple communications ports 124 having the same or different interface types may be included in one or more of the port groups 120. For example, a port group 120 may include a USB communications port 124 and a Firewire communications port 124. In other examples other combinations of the well-known communications standards listed above and/or new or proprietary standards may be made.

Figure 2A:
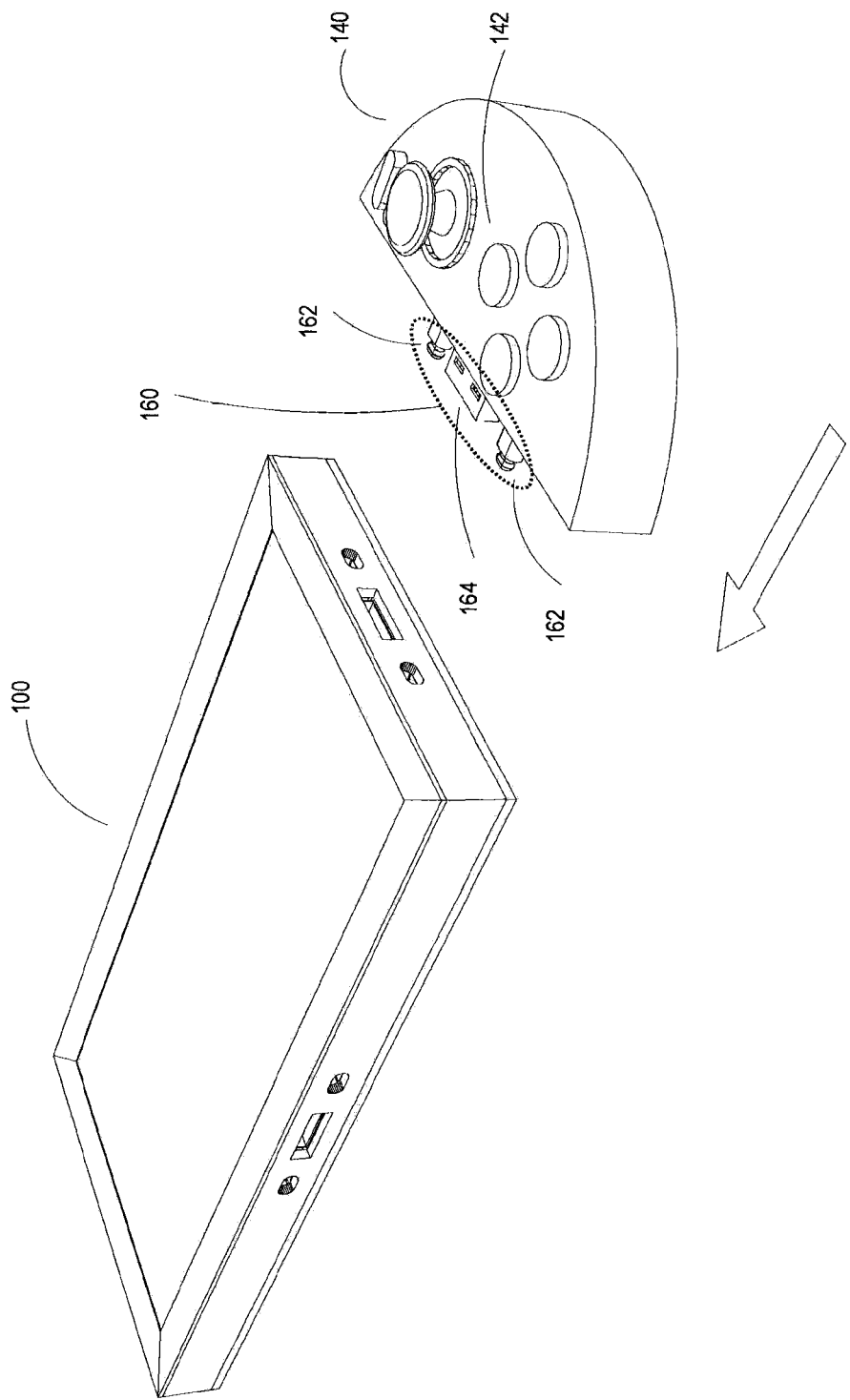
FIG. 2A illustrates a portable computer system configured to receive an exemplary game accessory, according to an embodiment of the present invention.

FIG. 2A illustrates a portable computer system configured to receive a game accessory, according to an embodiment of the present invention. A game accessory 140 may include common physical controls 142, such as buttons, a joystick, or other input controls. According to an embodiment of the present invention, a connector group 160 may be composed of two retention posts 162 which may be constructed from metal or other electrically conductive material, and one communications connector 164, but any number of each connector may be used. The connector group may be configured to be receivable by a similarly configured port group 120.

Figure 2B:
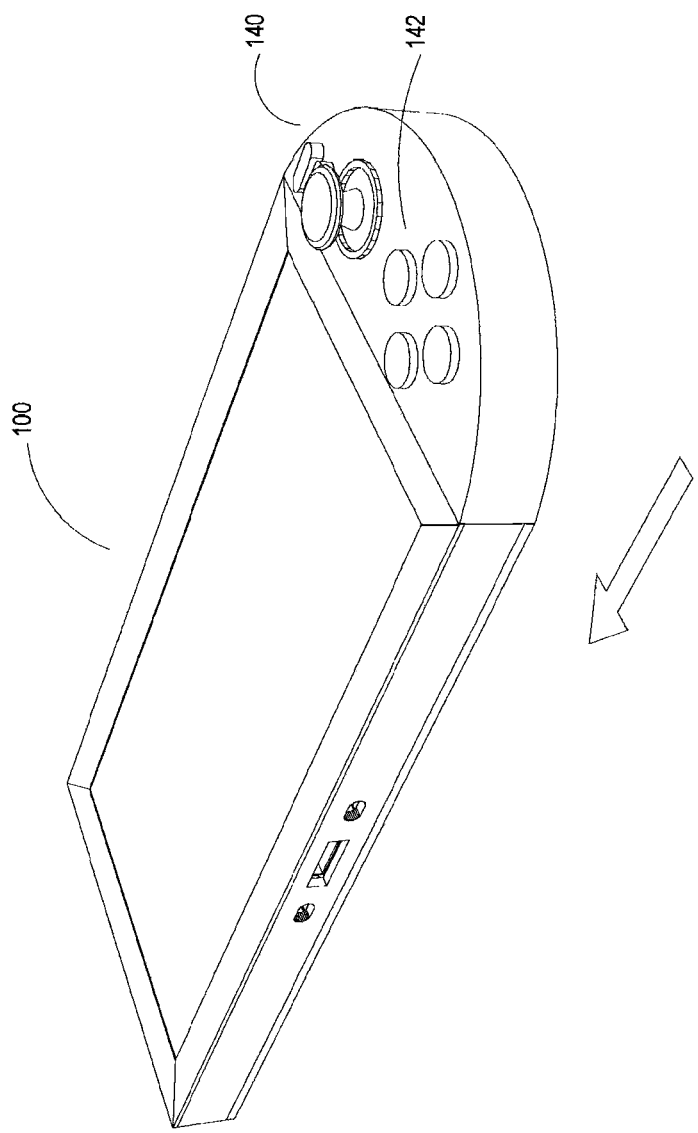
FIG. 2B illustrates a portable computer system integrally attached to an exemplary game accessory, according to an embodiment of the present invention.

FIG. 2B illustrates a portable computer system integrally attached to a game accessory, according to an embodiment of the present invention. In an embodiment of the present invention, the combination of communication and retention elements may allow the gaming accessory 140 to input commands to a software application running on the computer system 100, while also providing structural reinforcement for the computer system and engaged accessories.

Figure 3:
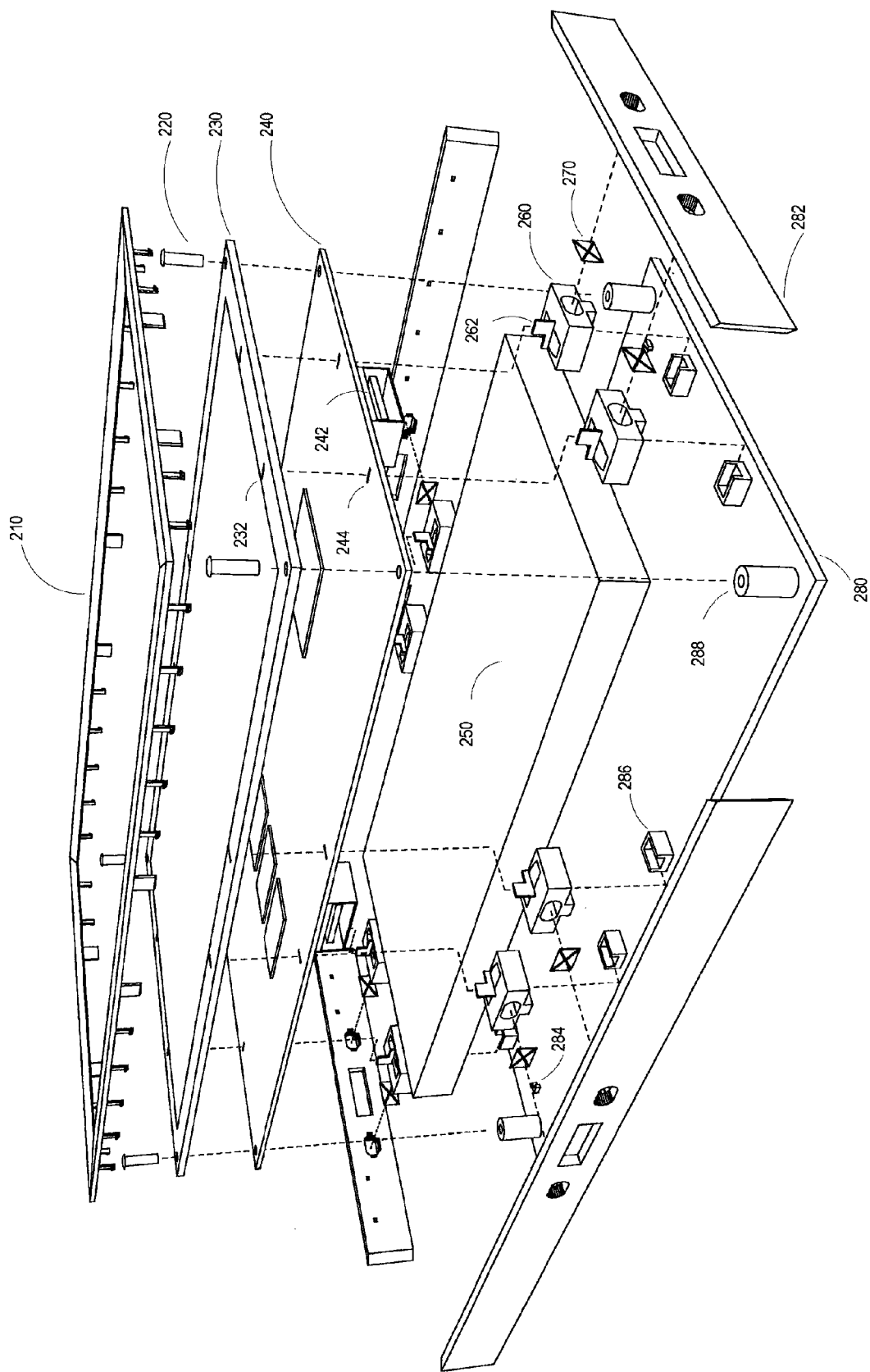
FIG. 3 illustrates an exemplary portable computer system, in exploded view, according to an embodiment of the present invention.

FIG. 3 illustrates a portable computer system in exploded view, according to an embodiment of the present invention. The portable computer system may be constructed in the form of a multilayer "sandwich", with components from different layers interconnected for to provide structural integrity and electrical power and signaling.

The top face may include a bezel 210, which in turn may partially cover a touch-screen 230 or other display. The touch-screen 230 may be electrically mated with a circuitboard 240. The circuitboard 240 may contain various components of a portable computer device, such as a CPU, graphics processor, operating memory, communications busses, storage devices, and/or other equipment. Additionally, the circuitboard 240 may contain multiple communications ports 242, for example USB 2.0 ports, mounted on the underside of the circuitboard 240. In this example, the communications ports 242 are mounted on all four sides, but other configurations are possible. A rechargeable battery 250 or other suitable power source may electrically mate to the underside of the circuitboard 240.

These components may be mounted in a chassis 280, which is shown in further exploded view. The chassis 280 may include sidewalls 282, which may contain cutouts in the shape and size to receive retention posts 162 and communications connectors 164, such as those shown in FIG. 2A. The battery 250 may be partially secured by brackets 284 and 286, which may be extruded from or attached to the surface of the chassis 280. The brackets 284 and 286 may be configured and located to receive the battery 250 and secure it laterally. The battery 250 may also be secured by retention structures 260, which may be inserted into and secured by the brackets 286. The touch-screen 230 and circuitboard 240 may be secured by inserts 220, which may be received by receptacles 288. The receptacles 288 may be extruded from or attached to the surface of the chassis 280.

Retention structures 260 may also secure the touch-screen 230 and circuitboard 240. The retention structures 260 may have a "dorsal fin" structure 262, which may fit into slots 232 and 244. Other interlocking configurations for the retention structures 260 and slots 232 and 244 may be provided in other embodiments. The slots 232 and 244 may be electrically conductive and may be part of at least one of the circuits contained within the touch-screen 230 and circuitboard 240. The retention structures 260 may be fabricated of metal or other conductive material in some embodiments, and may serve as conduits for electrical power as well as electrical signaling.

This configuration and method of construction may allows a portable computer system to provide electrical power to an accessory, and/or may allow an accessory to provide electrical power to the portable computer system. Electrical power or signals may flow via retention structures 260 and retention posts 160 as illustrated in FIG. 2A, either alone or in conjunction with communications ports 242 and communications connector 164 as illustrated in FIG. 2A. In some embodiments of the invention, an accessory may contain additional battery units to help power the portable computer system. In some embodiments, an accessory may be powered by the portable computer system, and/or may be have additional batteries recharged by the power circuitry of the portable computer system.

In some embodiments, accessories mated with a portable computer system may have some ability to communicate with the portable computer system. Communication between the accessories and the portable computer system may include configuration information, or may involve storing application specific information. Communication signals may travel through retention structures 260 and retention posts 160 as illustrated in FIG. 2A, either alone or in conjunction with communications ports 242 and communications connector 164 as illustrated in FIG. 2A. In another embodiment of the invention, the electrical connection between an accessory and the portable computer system retention elements may be used for low-bandwidth signaling of information such as application state, suggested portable computer system configuration, or other information. The low-bandwidth signaling may use an industry-standard protocol, e.g., $I^2C$ or SMBus. The accessory may contain either volatile or non-volatile storage in which such information may be stored. In another embodiment of the present invention, configuration specific data may be stored within non-volatile storage, e.g., a PROM or EEPROM. Non-volatile storage examples may be commonly found in many peripherals employing industry-standard communications protocols, e.g., USB, HDMI, etc., and may employ vendor-specific extensions permitted by such standards.

Additionally, the configuration and method of construction shown in the example of FIG. 2 may allow a portable computer system to receive various accessories. This configuration and method of construction may provide structural integrity to withstand forces of torsion, flex and other physical stresses to which a user may subject a combined unit, to avoid damage to delicate electrical connectors, and to provide a physically secure mated state between accessories and the portable electronic system. The portable electronic system and the accessories may be mated sufficiently securely to allow a user to manipulate the physical position of the portable electronic system by grasping attached accessories. For example, a user may attach game accessories 140 which may be contoured to be held by a human hand. The user may grasp the game accessories 140 while using or transporting the portable electronic system. A sufficiently rigid and secure attachment allows a user to do so without causing damage to the portable electronic system, the accessories, or the retention structures 260 connecting the portable electronic system and the accessories. The retention element 260 may utilize an inner coupling mechanism to ensure a physically secure mated state between accessories and the portable electronic system.

Figure 4A:
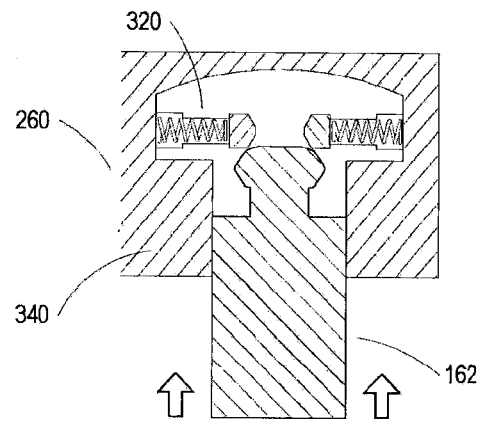
FIG. 4A is a partial cross-sectional view of a retention element receiving a retention post in an unengaged position, according to an embodiment of the present invention.

FIG. 4A is a partial cross-sectional view of the retention element 260 of FIG. 2 receiving the retention post 162 of FIG. 2A, in an unengaged position, according to an embodiment of the present invention. The retention element 260 may comprise a housing 340 which may be shaped to receive a retention post 162. The housing 340 may contain two opposed spring-loaded plungers 320.

Figure 4B:
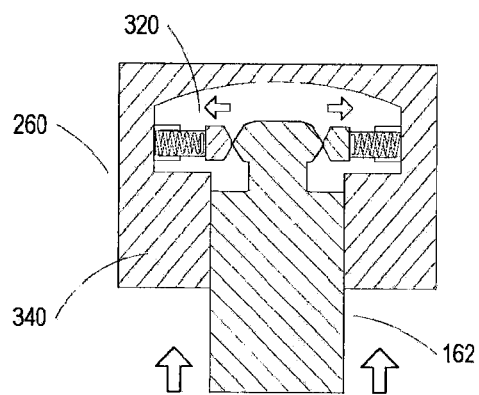
FIG. 4B is a partial cross-sectional view of a retention element receiving a retention post in a partially engaged position, according to an embodiment of the present invention.

FIG. 4B is a partial cross-sectional view of the retention element 260 of FIG. 2 receiving the retention post 162 of FIG. 2A, in a partially engaged position, according to an embodiment of the present invention. The retention post 162 and spring-loaded plungers 320 may be shaped such that insertion of retention post 162 may produce physical resistance for a user during the insertion process, even as the force exerted during the insertion process may cause the opposed spring-loaded plungers 320 to spread apart. Additionally, physical resistance may be present during the extraction process, due to the symmetric shape of the "head" of the retention post 162.

Figure 4C:
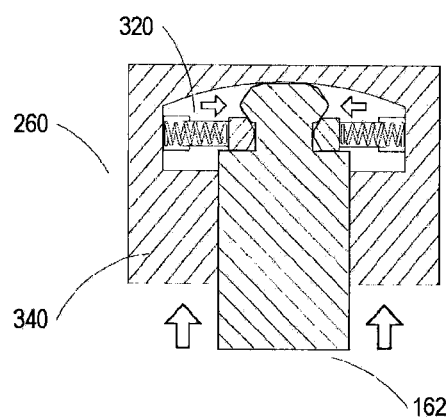
FIG. 4C is a partial cross-sectional view of a retention element receiving a retention post in a fully engaged position, according to an embodiment of the present invention.

FIG. 4C is a partial cross-sectional view of the retention element 260 of FIG. 2 receiving the retention post 162 of FIG. 2A, in a fully engaged position, according to an embodiment of the present invention. The retention post 162 and spring-loaded plungers 320 may be shaped such that the spring-loaded plungers fully or substantially extend into the "neck" of the retention post 162, firmly securing the retention post 162 until such time as removal is desired.

Portable computer systems can be used for video-based applications, for example, to record video in the fashion of a traditional camcorder and/or to view and edit works of video. Also, portable computer systems can be used for image-based applications, for example, to record still images and/or to view and edit images. In various embodiments of the present invention, different camera attachments, and multiple camera attachments, may be employed. For example, the portable computer system may accept attachment of cameras having various image qualities, zoom features, 2D or 3D imaging features, still or video imaging features, other features, or combinations thereof. In some embodiments, multiple cameras may be attached to enable experimentation, 3D imaging, or other options. Also, in various embodiments of the present invention, an application executed on the portable computer system may set various user preferences, load different software applications, and/or reconfigure the underlying hardware in various fashions based on information regarding current camera attachments, camera physical configurations, and/or accessory physical locations relative to the portable computer system.

Figure 5:
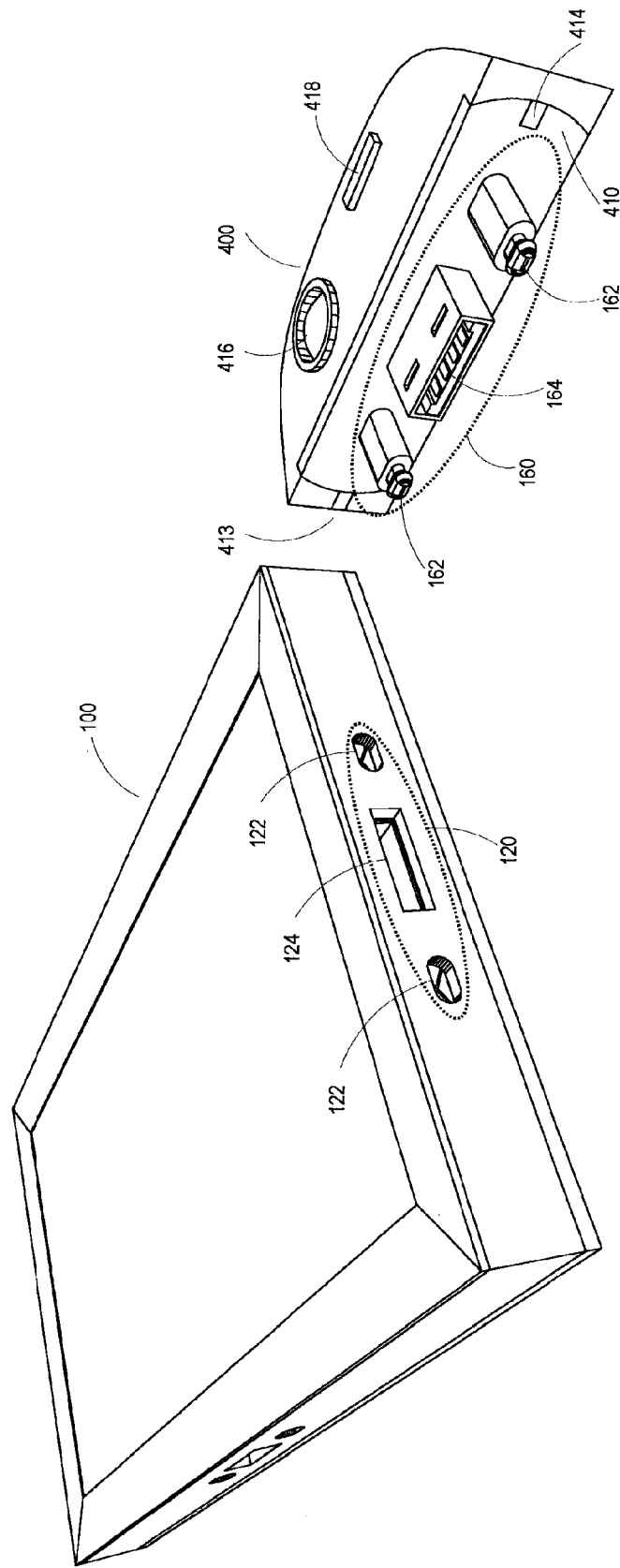
FIG. 5 illustrates a portable computer system configured to receive a camera accessory, the camera accessory including a lens, a flash unit, a swiveling mechanism and orientation sensors, in addition to a standardized combination of an industry standard data bus connector and structural members, according to an embodiment of the present invention.

FIG. 5 illustrates a portable computer system configured to receive a camera accessory, according to an embodiment of the present invention. The camera accessory 400 may include a lens 416, flash unit 418, swivel mechanism 410, orientation sensors 413 and 414, microphones 412 (obscured in this view), connector group 160, containing retention posts 162, and communications connector 164. Individual elements of the camera may be added or omitted in various embodiments. The connector group 160 may be configured to be received by the port group 120. The port group 120 may comprise retention ports 122 and communications port 124 and be contained within portable computer system 100. In an embodiment of the present invention, the port groups 120 may be located on all four sides of portable computer system 100. Other embodiments may have port groups 120 arranged in other configurations.

Figure 6:
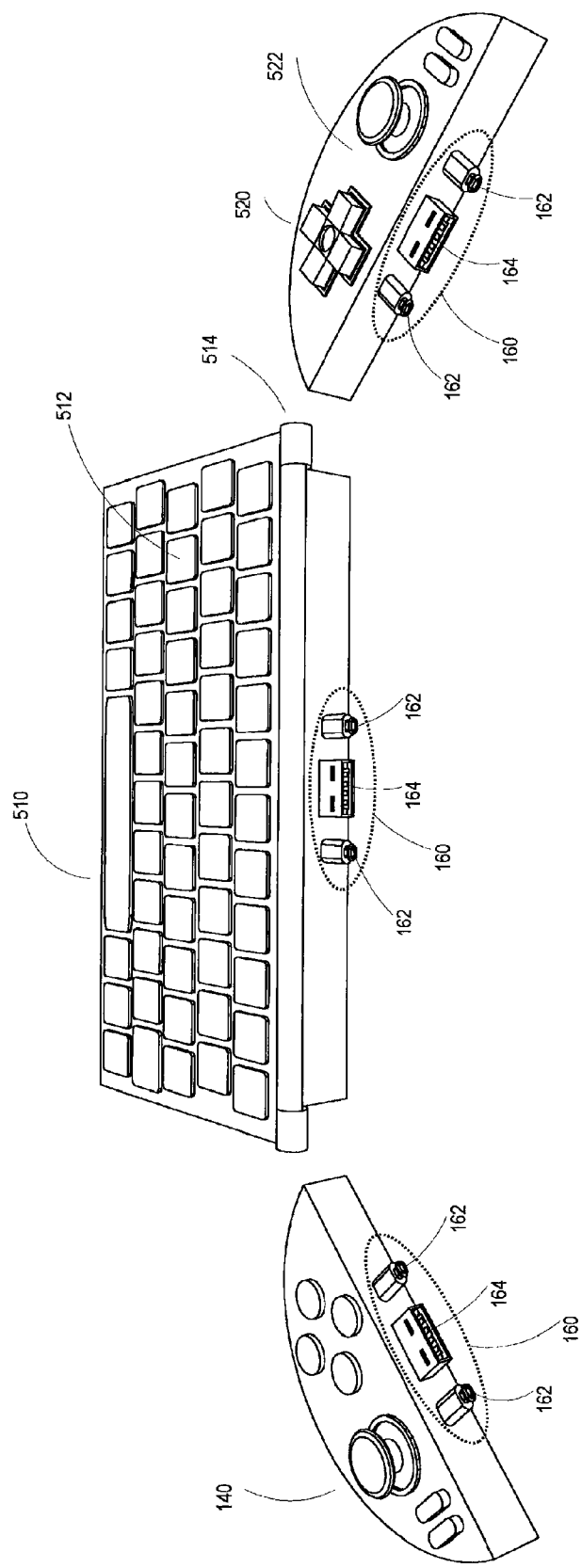
FIG. 6 illustrates a variety of accessories designed to be received by a portable computer system illustrated in previous figures, among them two variations of game accessories, collectively including joysticks, a variety of buttons and a D-Pad, and also among them a folding keyboard, with all shown accessories including a standardized combination of an industry standard bus connector and structural members, according to an embodiment of the present invention.

FIG. 6 illustrates a variety of accessories designed to be received by a portable computer system illustrated in previous figures. Accessories may include, but are not limited to, a game accessory 140 and a game accessory 520, which features common physical controls 522, including buttons, a joystick, and a d-pad, along with connector group 160. A folding keyboard 510, featuring standard keyboard buttons 512, hinge mechanism 514, and connector group 160, may also be provided in some embodiments of the invention. Accessories may be provided with communications ports configured to match communications ports 124 of the computer system. In some embodiments, accessories may be equipped with multiple communications ports in various combinations. For example, USB, Firewire, HDMI, Ethernet, or other known or proprietary connections may be provided in any combination. This may allow an accessory to be attached to a portable computer system using different types of communications ports. In some embodiments, connecting an accessory with different communications ports or in different positions may alter the physical ergonomics of the combined computer system and accessory.

Portable computer systems can be used for displaying text-based files, often referred to as e-reading or ebook applications, and they can be used to record, display and manipulate audio and video information. In various embodiments of the present invention, a control accessory 600 may be employed as a way of controlling an e-book reading application, or employed as a way of controlling an audio or video manipulation application, or it may be used in combination with a camera accessory to provide recording controls for a video recording application. In various embodiments of the present invention, different key or control button layouts may be employed. Also, in various embodiments of the present invention, an application executed on the portable computer system may set user preferences, load different software applications, or reconfigure the underlying hardware in various fashions using information regarding physical location of the control accessory relative to the portable computer system.

Figure 7:
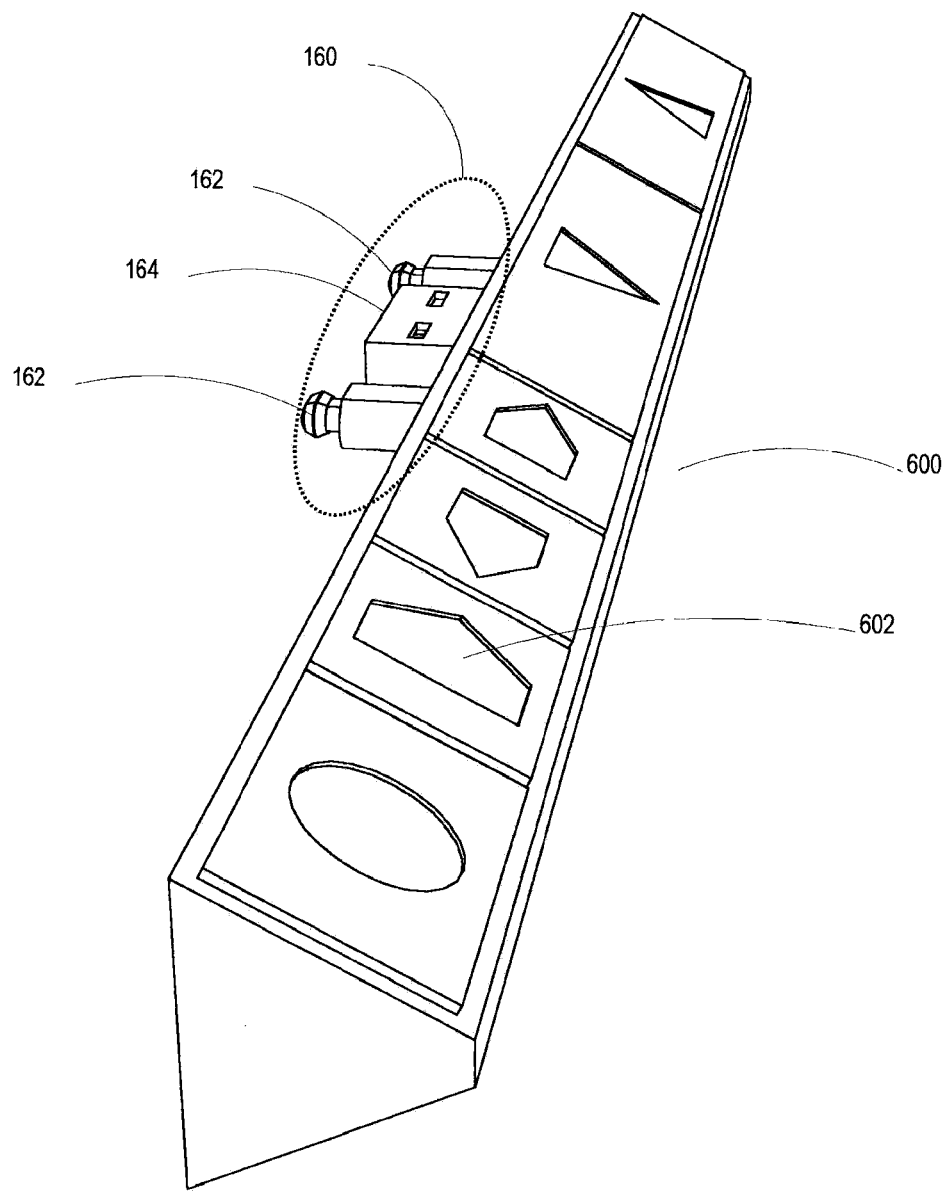
FIG. 7 illustrates a control accessory designed to be received by the portable computer system illustrated in previous figures, including a standardized combination of an industry standard bus connector and structural members, according to an embodiment of the present invention.

FIG. 7 illustrates a control accessory 600 or control panel, which includes control buttons 602 and a connector group 160, designed to be received by a portable computer system illustrated in previous figures, according to an embodiment of the present invention.

In various embodiments of the present invention, the portable computer system can be used to receive telemetry from a vehicle, for example a current operating state including measurements of revolutions per minute of various components. Such telemetry may be received by a portable computer system via communications connector 164. The computer system may use the telemetry to compute information such as speed and estimated time to arrive at a given destination, for example. Also, such telemetry may be received and combined with other information, such as coordinates from a Global Positioning System (GPS) receiver, to provide a virtual compass or an interactive navigational aid. The telemetry may also be used for displaying various vehicle diagnostics. In some embodiments, the GPS receiver may be provided as a peripheral accessory attachment to be received by the portable computer system.

Figure 8:
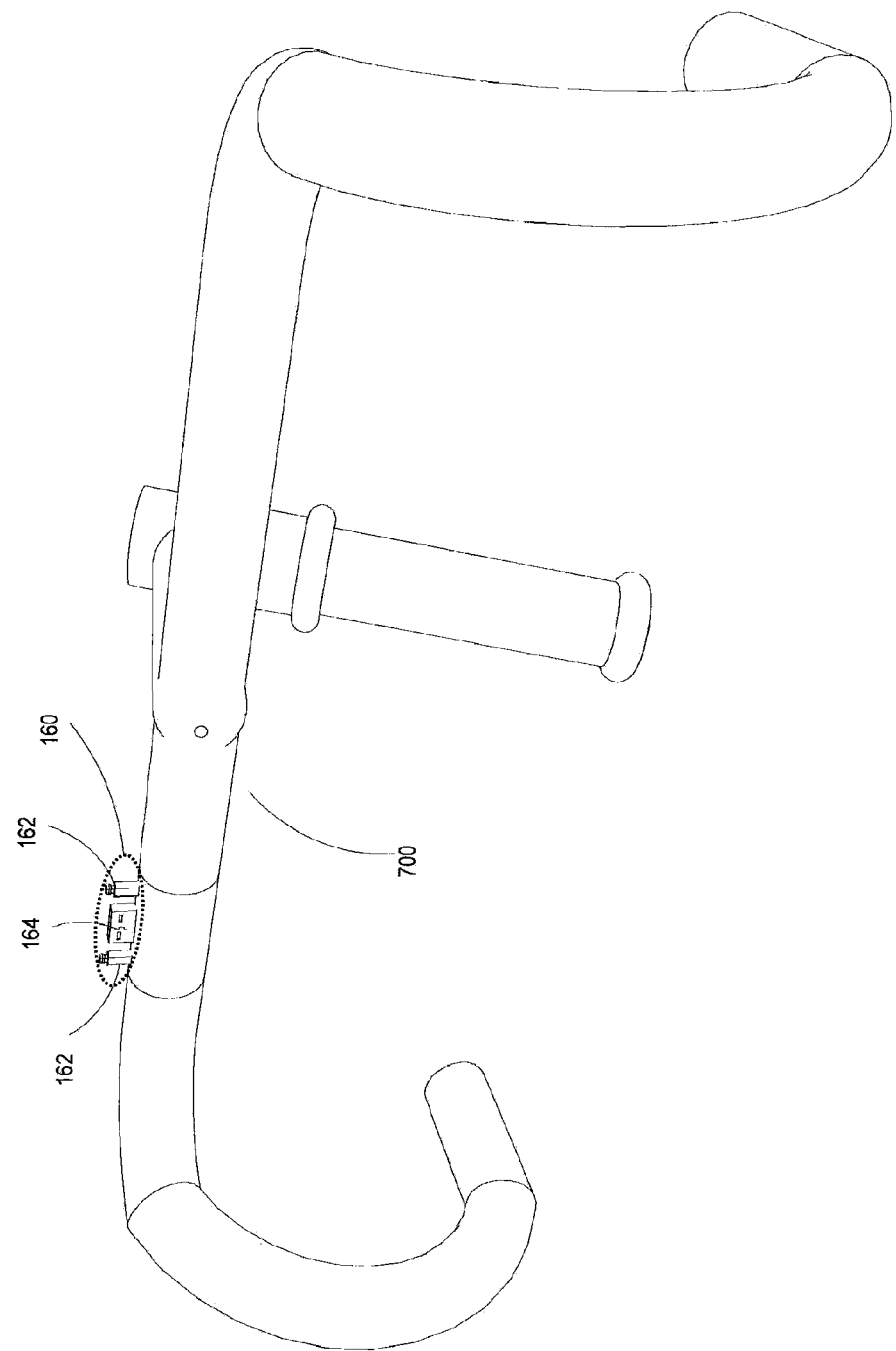
FIG. 8 illustrates a vehicle mount, designed to be received by the portable computer system illustrated in previous figures, including a standardized combination of an industry standard bus connector and structural members, according to an embodiment of the present invention.

FIG. 8 illustrates a vehicle mount 700, designed to he received by the portable computer system illustrated in previous figures, and featuring connector group 160.

Portable computer systems can be used for text-based applications, for example, to view, create and edit documents, and to compose, send and receive email messages. Some embodiments of the present invention may provide control inputs, e.g., a physical keyboard, that may be manipulated by a user. In various embodiments of the present invention, different keyboard layouts may be employed. Also, in various embodiments of the present invention, an application executed on the portable computer system may set user preferences, load different software applications, and/or reconfigure the underlying hardware in various fashions based on information regarding keyboard angle or a physical location of the keyboard accessory relative to the portable computer system.

Figure 9A:
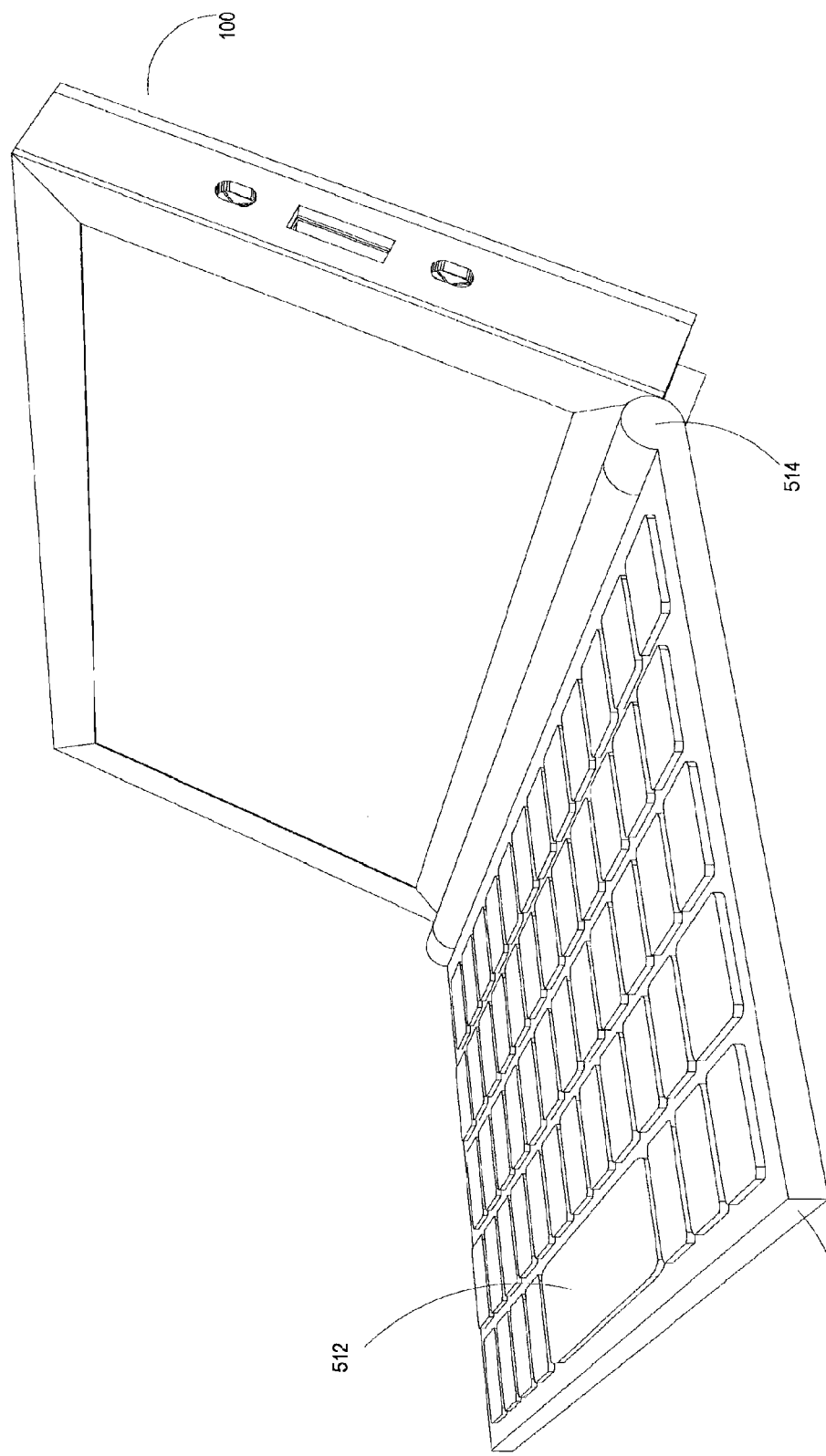
FIG. 9A illustrates an exemplary portable computer system integrally attached to a folding keyboard accessory, according to an embodiment of the present invention.

FIG. 9A illustrates a portable computer system 100 integrally attached to a folding keyboard accessory 510, according to an embodiment of the present invention. An application running on the portable computer system 100 may be controlled via keyboard buttons 512. Additionally, in some embodiments of the invention, the hinge mechanism 514 may contain a potentiometer or other sensor such that the angle of the keyboard may be determined by an application running on the computer system 100.

Figure 9B:
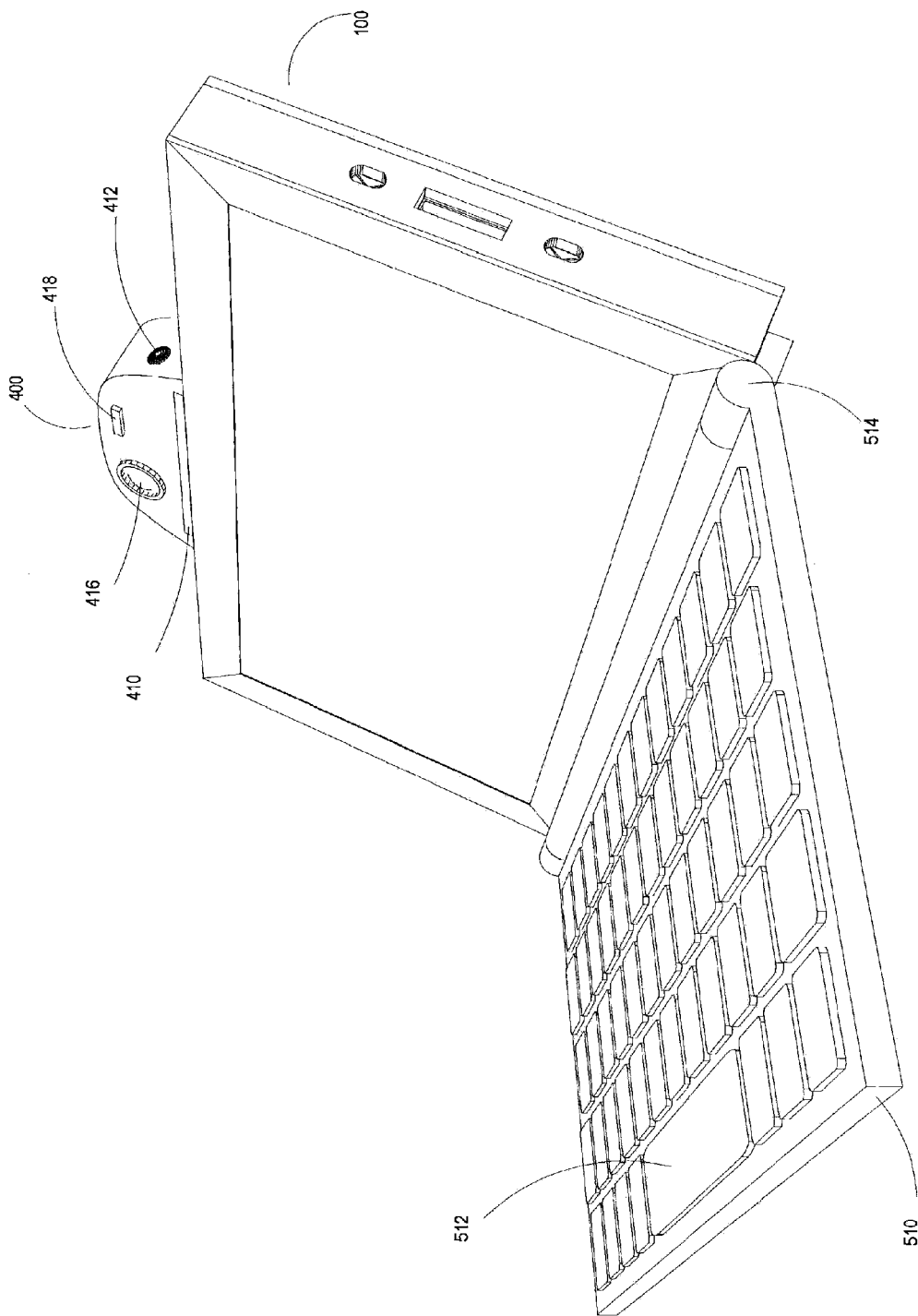
FIG. 9B illustrates a portable computer system integrally attached to a keyboard accessory and a swiveling camera accessory, according to an embodiment of the present invention.

FIG. 9B illustrates a portable computer system 100 integrally attached to both a folding keyboard accessory 510 and a swiveling camera accessory 400, according to an embodiment of the present invention. This combination may enable a user to use applications such as multi-user chat, where a user may communicate with other users via a camera serving as a webcam in and/or via text. The combination may also enhance text entry, as the camera may capture information regarding ambient light or noise (via a microphone 412) and cause the computer to adjust operating parameters for a given application based on data derived from that input.

Figure 9C:
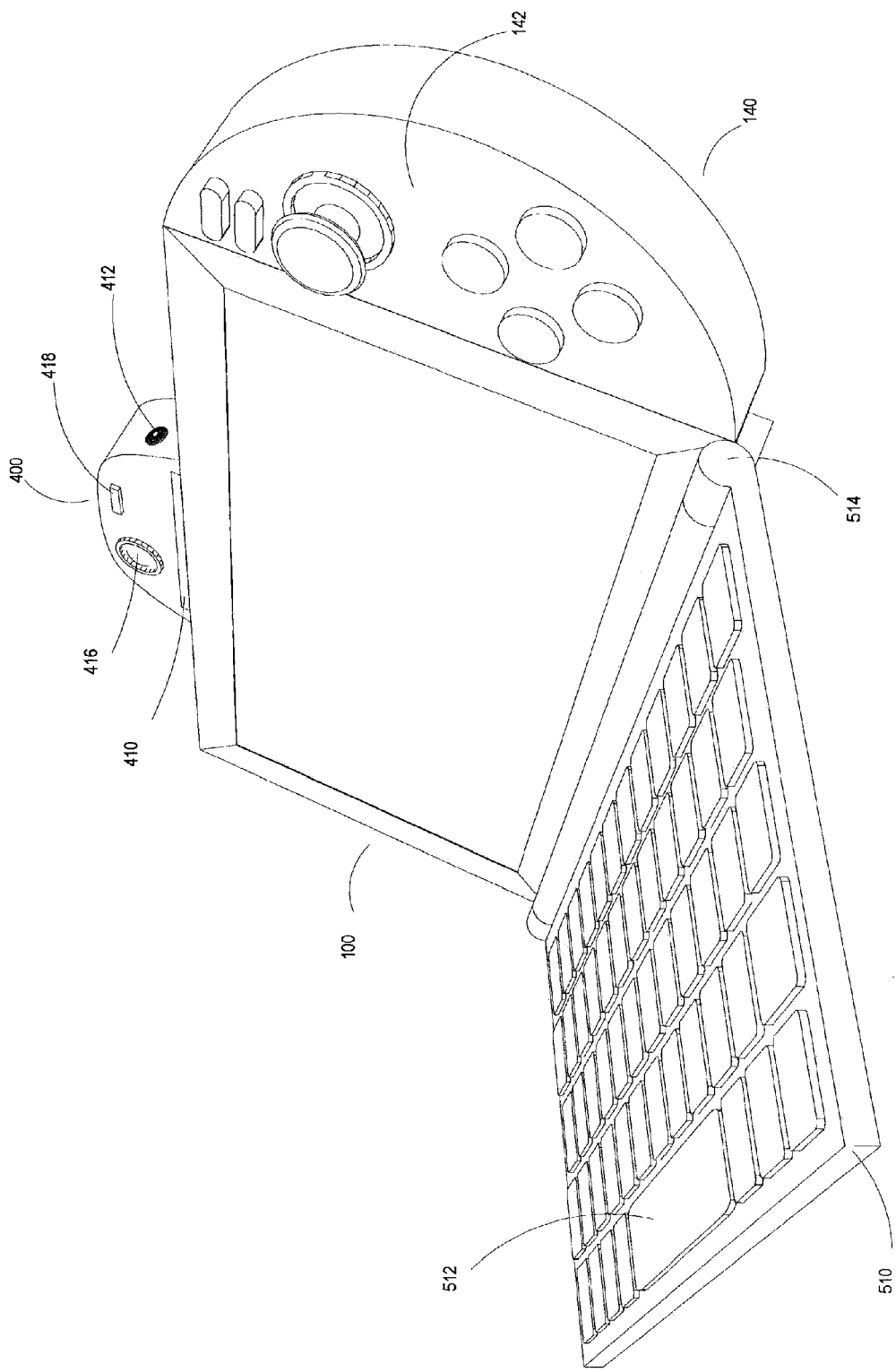
FIG. 9C illustrates a portable computer system integrally attached to a keyboard accessory, a swiveling camera accessory, and a game pad accessory, according to an embodiment of the present invention.

FIG. 9C illustrates a portable computer system 100 integrally attached to a folding keyboard accessory 510, a swiveling camera accessory 400, and a game accessory 140, according to an embodiment of the present invention. This combination may enable a user to use applications such as videoconferencing, where a keyboard may be used for text entry, a camera for video and audio presentation of the user, and a pointing device to create drawings on a virtual whiteboard, or be used for other application control purposes. The same configuration may be used for video games calling for team play, such as "first person shooters", or FPS's, which may make use of a keyboard and pointing device such as a joystick for control input, and a camera and/or microphone to enable communications with remote teammates. The configuration may also be useful for other types of games and programs.

Figure 10A:
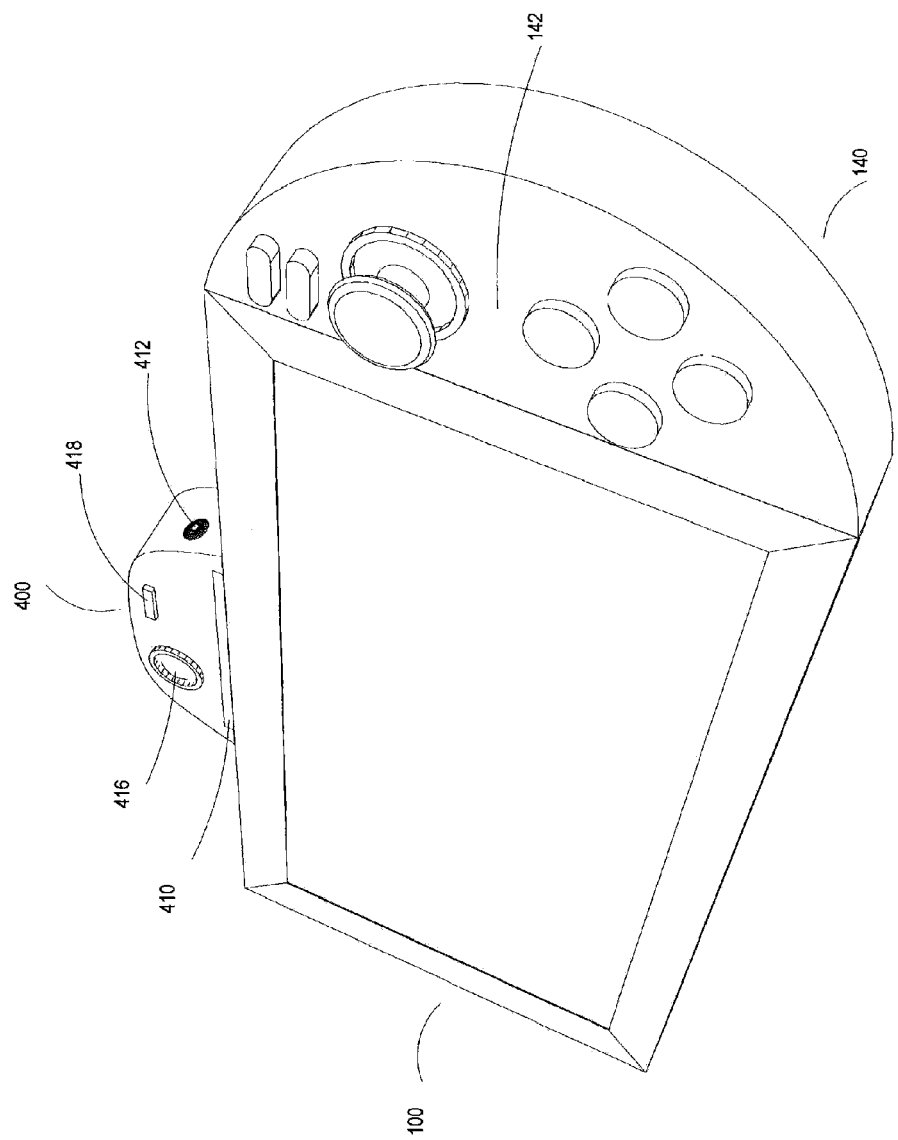
FIG. 10A illustrates a portable computer system integrally attached to a swiveling camera accessory and a game pad accessory, according to an embodiment of the present invention.

FIG. 10A illustrates a portable computer system 100 integrally attached to a swiveling camera accessory 400 and a game accessory 140, according to an embodiment of the present invention. This combination may enable a user to use applications such as videoconferencing in a portable context. For example, a camera may enable video and audio presentation of the user, and a pointing device may allow a user to create drawings on a virtual whiteboard, or be used for other application control purposes. The same configuration may be used for video games calling for team play or other video games or programs.

Figure 10B:
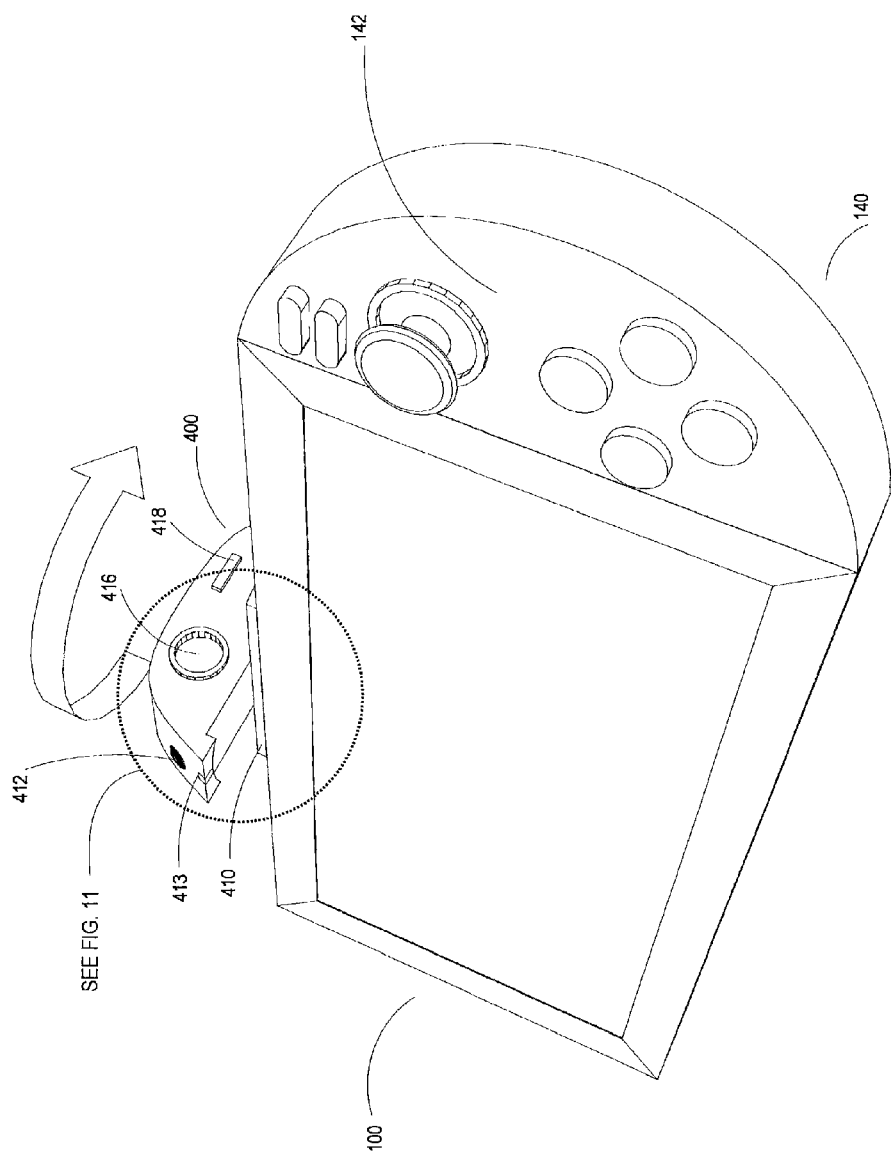
FIG. 10B illustrates a portable computer system integrally attached to a swiveling camera accessory and a game pad accessory, with the swiveling camera partially rotated, according to an embodiment of the present invention.

FIG. 10B illustrates a portable computer system 100 integrally attached to a swiveling camera accessory 400 and a game accessory 140, according to an embodiment of the present invention. In various embodiments of the present invention, an application executed on the portable computer system may employ information regarding the physical state of an accessory, for example the rotational position of the camera 400, to load different software applications or reconfigure the underlying hardware of portable computer system 100 in various fashions. A user holding the portable computer system 100 may rotate the swiveling camera accessory 400 to a new position.

Figure 11:
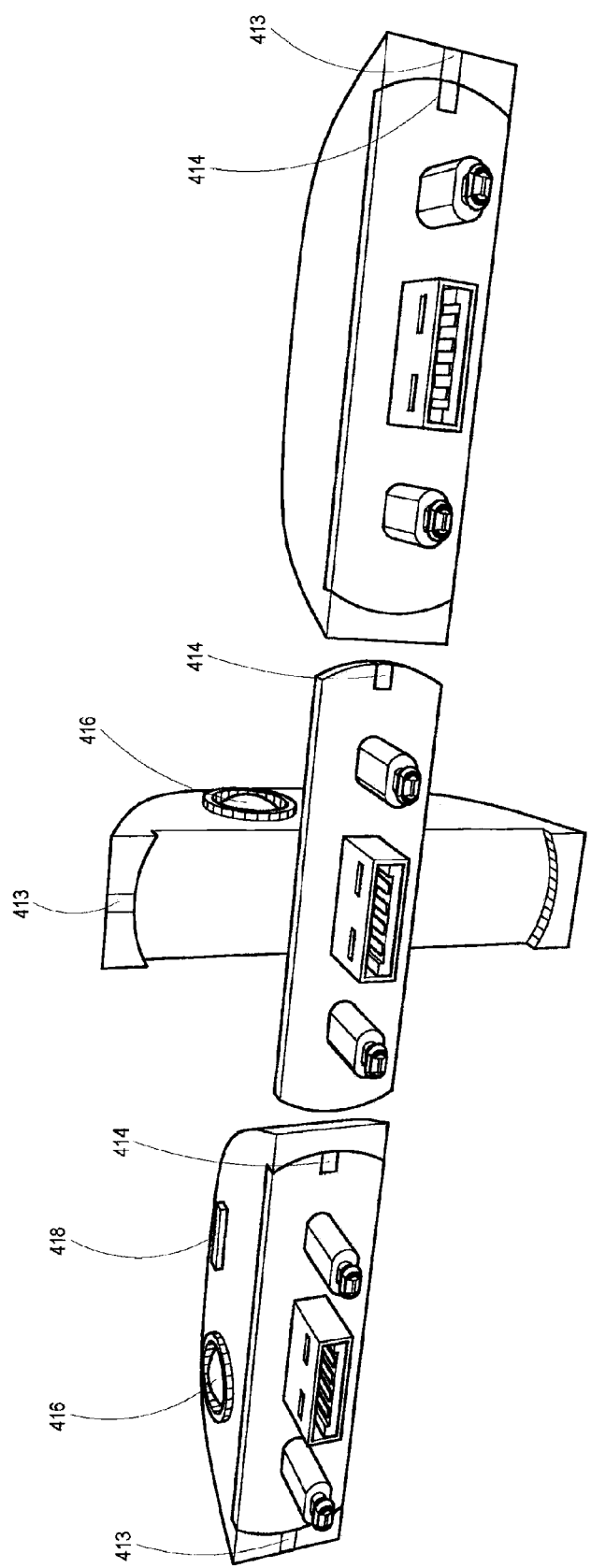
FIG. 11 illustrates a swiveling camera accessory designed to be received by a portable computer system shown in several swiveling positions, according to an embodiment of the present invention.

FIG. 11 illustrates the swiveling camera accessory 400 in enlarged and isolated views taken along line 11 of FIG. 10B, shown in several swiveling positions, according to an embodiment of the present invention. When the position of the camera accessory 400 is adjusted, the sensors 413 and 414 may detect the new physical configuration of the accessory. The sensors 413 and 414 may provide data (e.g., simple on/off state based on proximity or lack thereof) to an application executed on the portable computer system. In response, the application may load other software applications or reconfigure the underlying hardware of portable computer system 100 in various fashions.

Portable computer systems can be used for audio/video-based applications, for example, to create moving images with sound as with a dedicated recording device such as a camcorder. Embodiments of the present invention may provide control inputs, e.g., a joystick and buttons, that may be manipulated by a user.

Figure 10C:
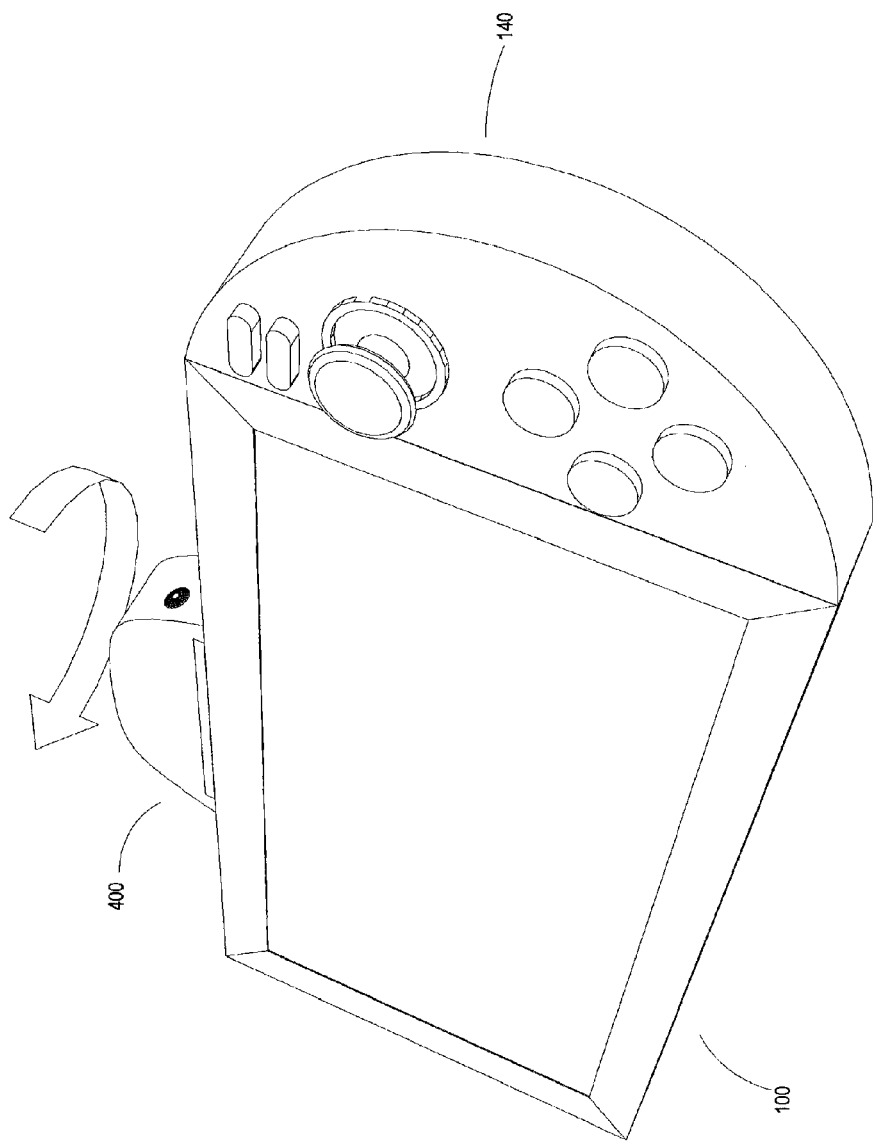
FIG. 10C illustrates a portable computer system integrally attached to a swiveling camera accessory and a game pad accessory, with the swiveling camera full rotated to front-facing mode, according to an embodiment of the present invention.

FIG. 10C illustrates a portable computer system 100 integrally attached to a swiveling camera accessory 400 and a game accessory 140, with the camera accessory 400 rotated into an alternate configuration, according to an embodiment of the present invention.

Figure 12:
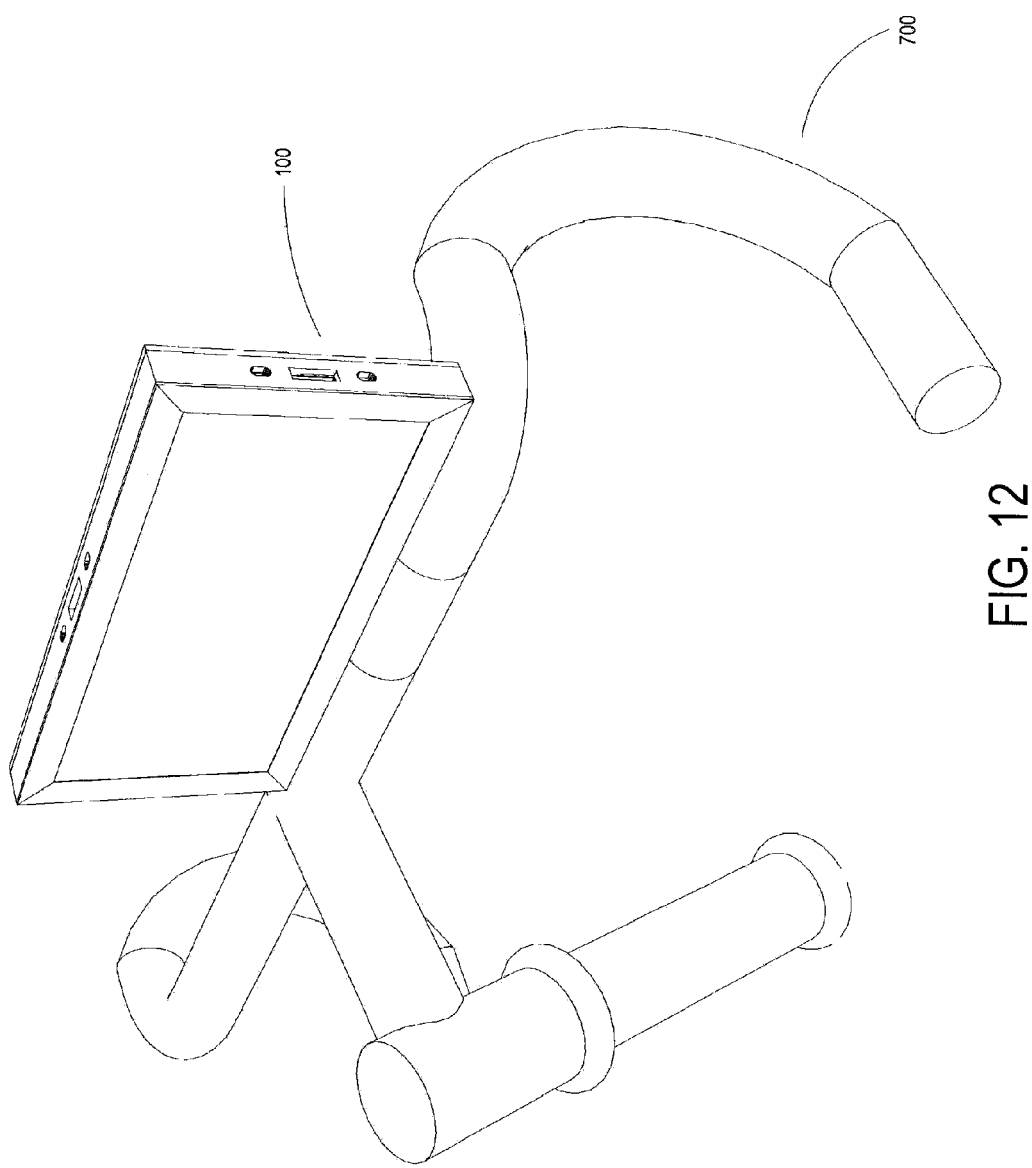
FIG. 12 illustrates a portable computer system integrally attached to a vehicle mount accessory, according to an embodiment of the present invention.

FIG. 12 illustrates a computer system 100 integrally attached to a vehicle mount 700, according to an embodiment of the present invention. Portable computer systems can be used for navigation purposes, for example, to display maps according to present location, to automatically create a route taken by a vehicle, and to provide a list of directions. Additionally, portable computer systems may be used for recording video. Some applications may combine both video and navigational data to create a type of electronic travelogue. FIG. 13 illustrates a configuration wherein a swiveling camera accessory 400 has been added to the configuration of FIG. 12.

Figure 14A:
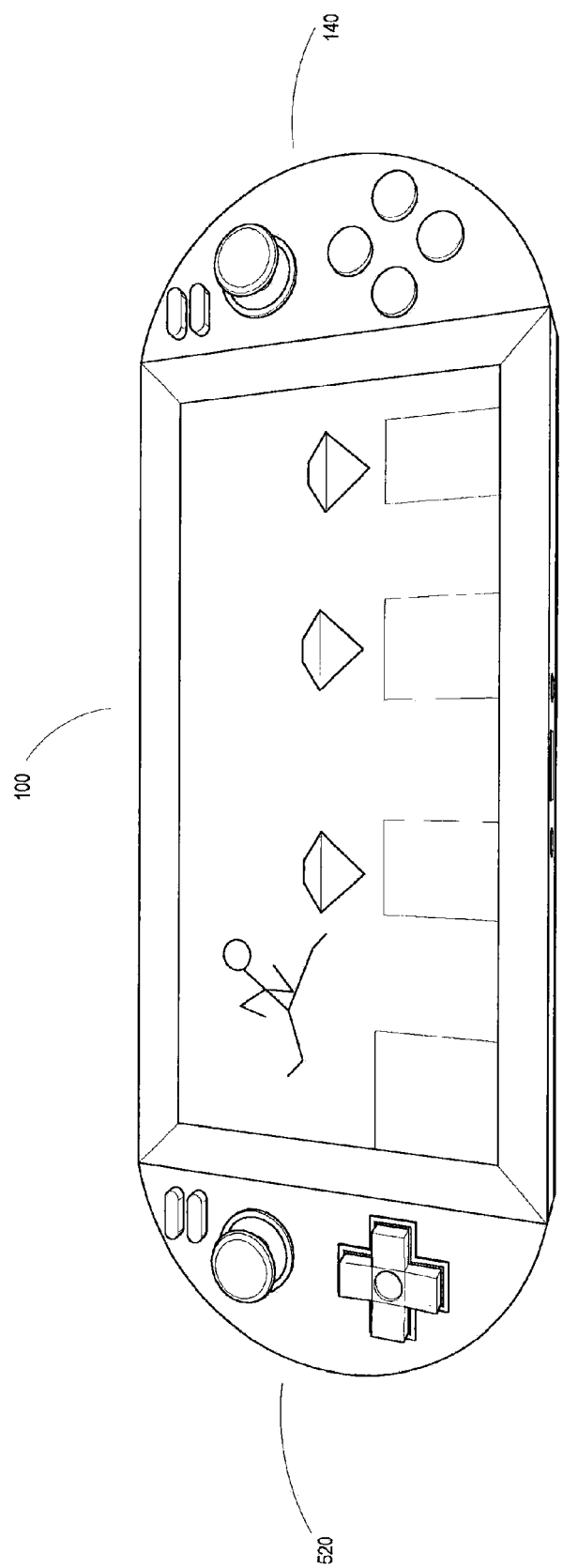
FIG. 14A illustrates a gaming application's screen presentation when a portable computer system is integrally attached to accessories, according to an embodiment of the present invention.
Figure 14B:
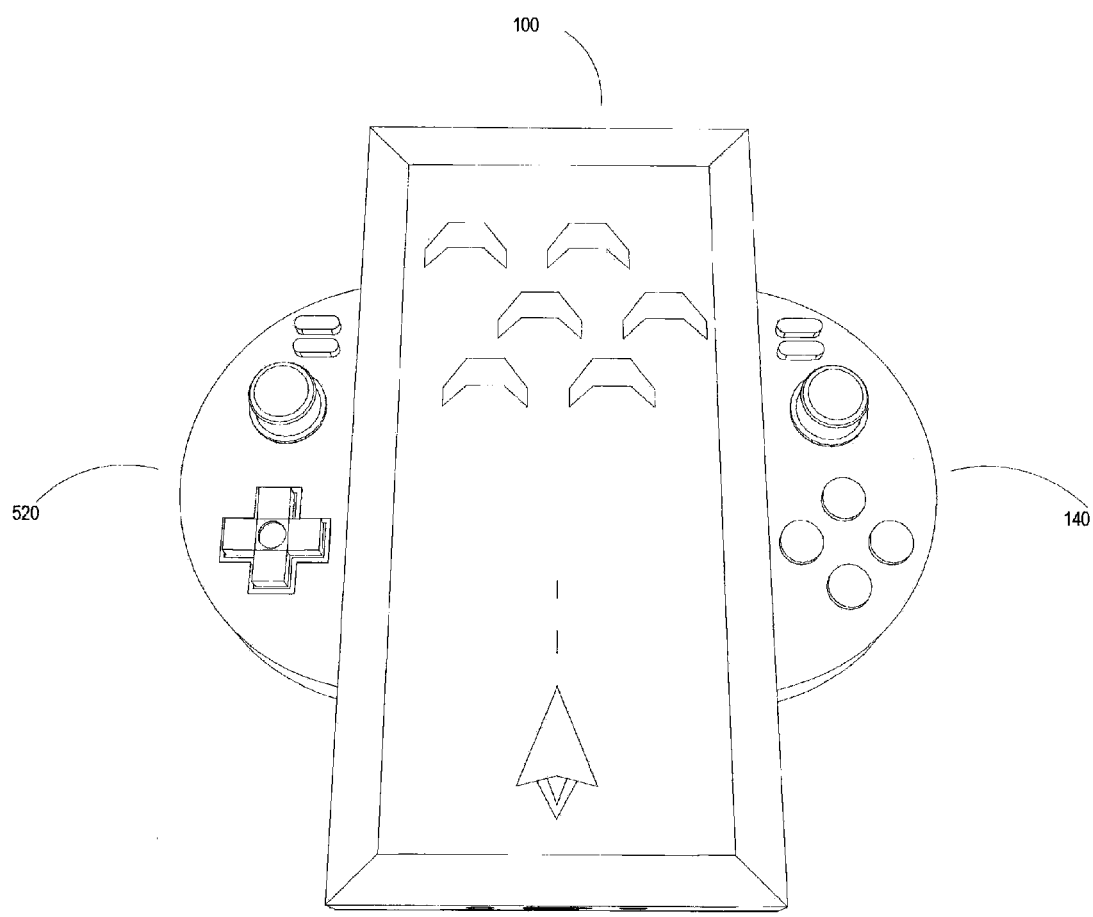
FIG. 14B illustrates a gaming application's screen presentation when a portable computer system is integrally attached to accessories, according to an embodiment of the present invention.

FIGS. 14A and 14B illustrate a computer system 100 integrally attached to gaming accessories 140 and 520 in alternate configurations, according to embodiments of the present invention. Portable computer systems can be used for video games and other programs of various types. In some cases, a user may orient the portable computer system in a landscape fashion, as shown in the example of FIG. 14A. In other cases a user may orient the portable computer system in a portrait fashion, as shown in the example of FIG. 14B. In some embodiments, different accessory orientations may be adapted for use with different games or types of games. For example, when playing games wherein an avatar may be directed in a left-to-right pattern of movement while interacting with the game environment (often called "platformers"), a user may configure the computer system 100 as shown in FIG. 14A. In other cases a user may configure the computer system 100 as shown in FIG. 14B, for example when playing games wherein an avatar may shoot or avoid objects falling from the sky. It will be understood that these games and orientations are presented as examples only, and a user may use any configuration to play any type of game. For example, a user may use the orientation of FIG. 14A to play a falling object game and the orientation of FIG. 14B to play a platformer. Other game types may be used in different embodiments as well. Accessories 140 and 520 or other accessories may be used in either a portrait or landscape configuration or other configurations.

Figure 15:
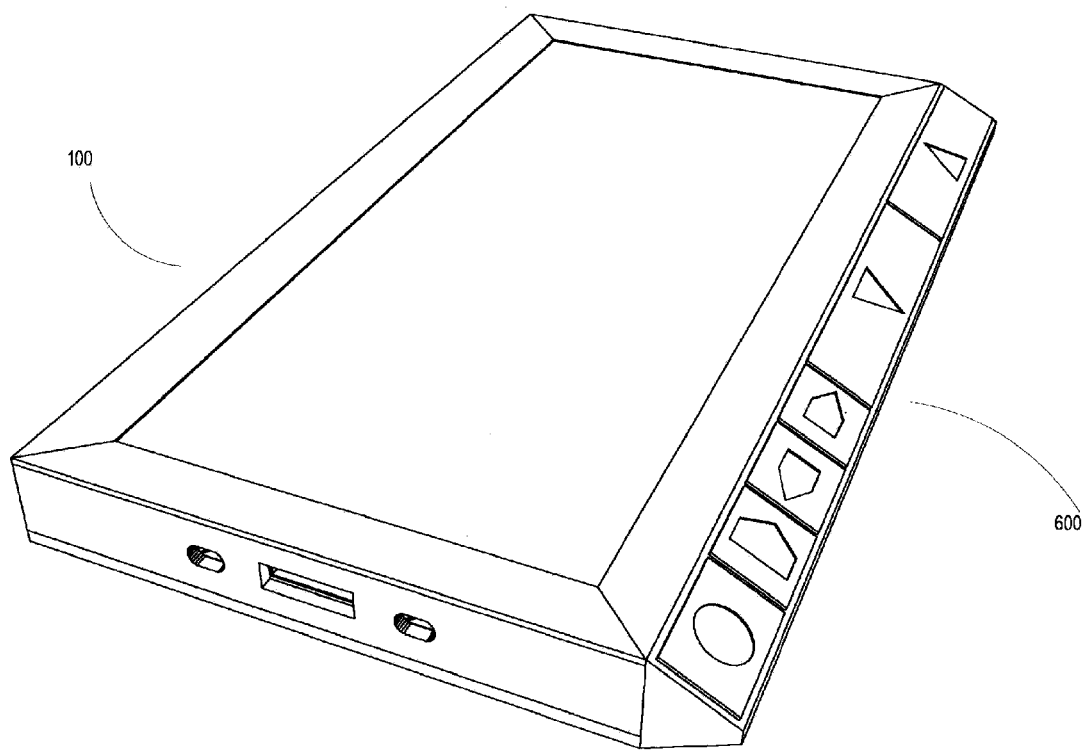
FIG. 15 illustrates a portable computer system integrally attached to a control accessory, according to an embodiment of the present invention.
Figure 16A:
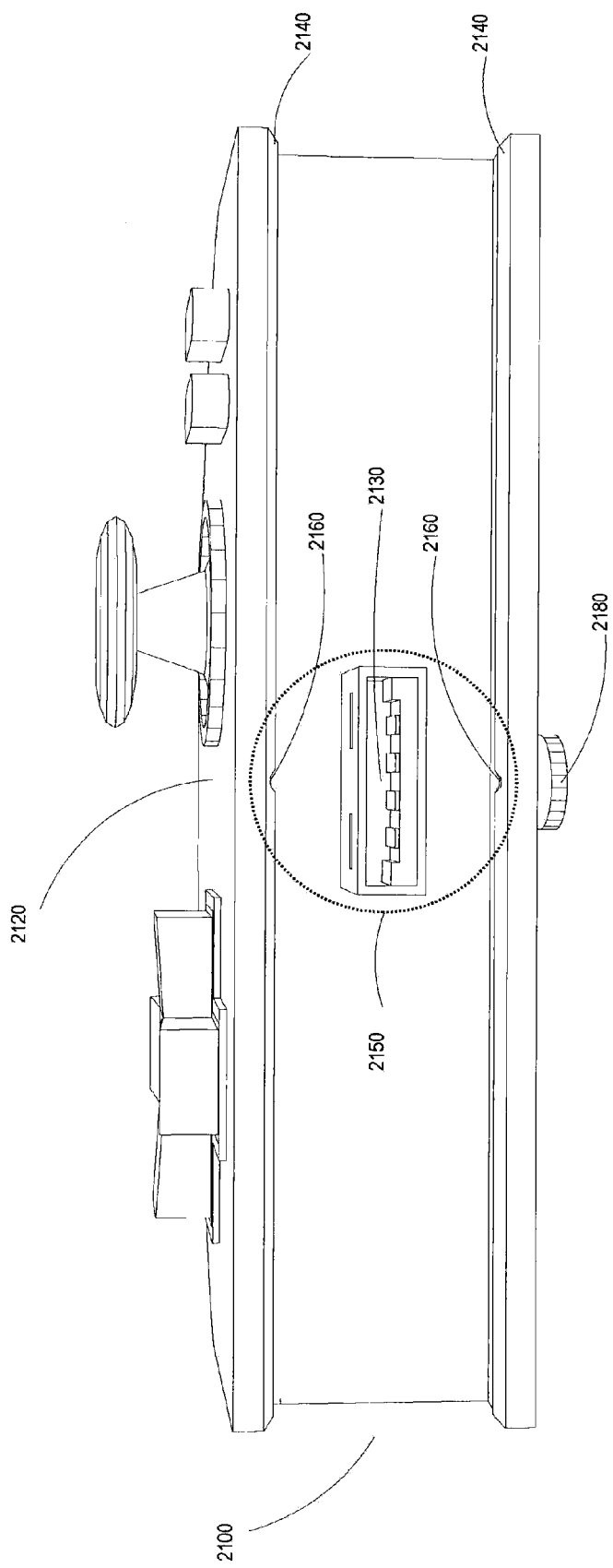
FIG. 16A illustrates a gaming accessory designed to be received by a portable computer system, according to an embodiment of the present invention.
Figure 16B:
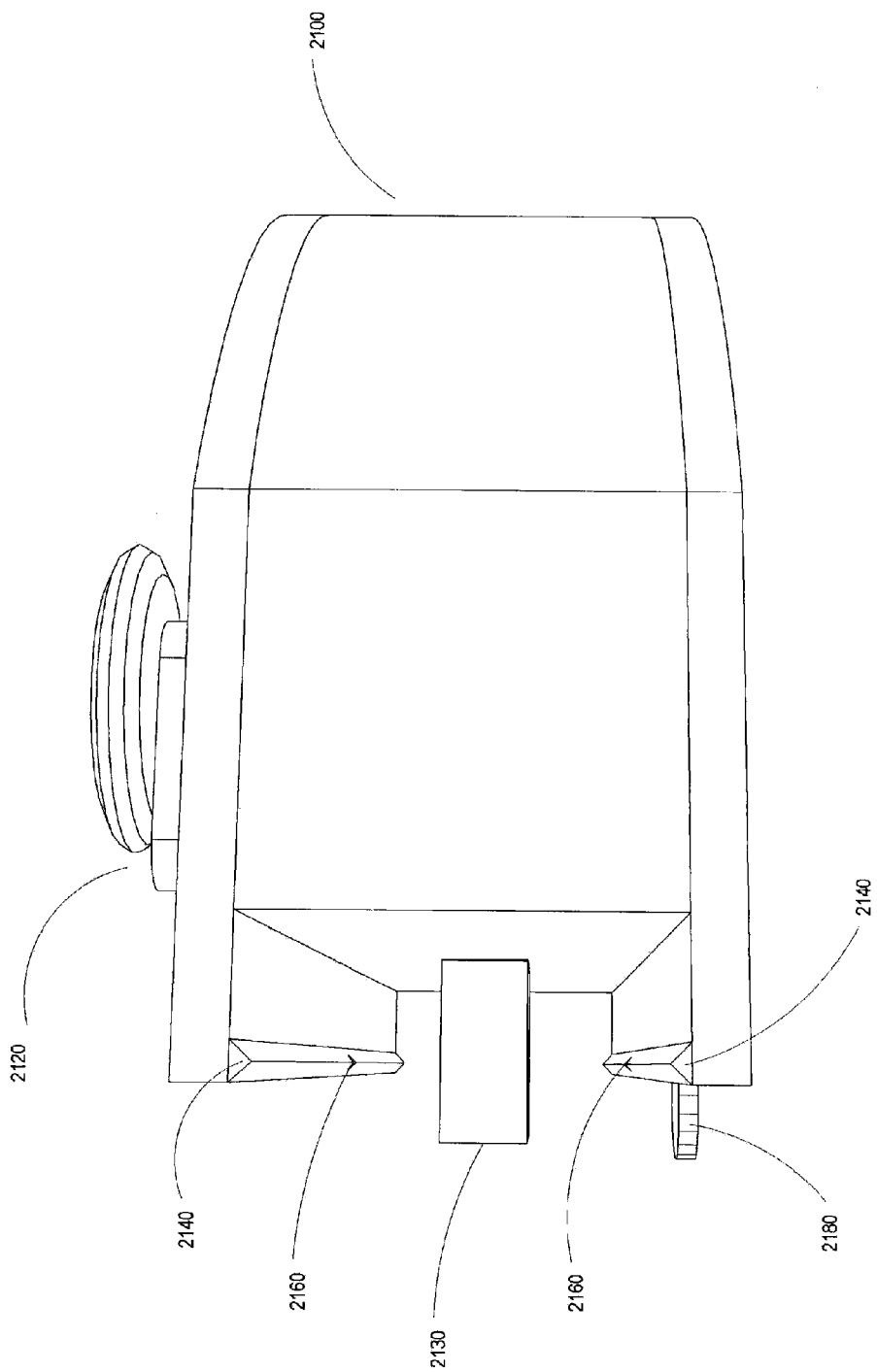
FIG. 16B illustrates a gaming accessory designed to be received by a portable computer system, according to an embodiment of the present invention.

FIG. 15 illustrates a computer system 100 integrally attached to a control accessory 600, according to an embodiment of the present invention. The control accessory 600 may be used with an e-book reader program, to scroll through documents or web pages, or for other purposes.

FIGS. 16A-17B illustrate a gaming accessory designed to be received by a portable computer system according to an embodiment of the present invention. Similar to previously illustrated embodiments of the invention, the gaming accessory 2100 may have physical controls 2120 including a d-pad, joystick, buttons, and/or other inputs. As in the previously illustrated embodiments of the invention, the gaming accessory 2100 may also employ a connector group, 2150, which may comprise retention tongues 2140 including retention cutouts 2160, and a communications connector 2130. The retention tongues 2140 may be constructed from metal or other electrically conductive material. In some embodiments of the present invention the communications connector 2130 may be a USB 2.0 connector, but could alternatively be any of a number of well-known communications standards and protocols such as, e.g., parallel, SCSI, Firewire, Ethernet, HDMI, etc. In some embodiments of the invention, the connector group 2150 may be composed of two retention elements, retention tongues 2140 with retention cutouts 2160, and one communications connector 2130, but other embodiments could include multiple communications connectors 2130 which may be receivable by similarly configured port groups on portable computer systems.

Figure 17A:
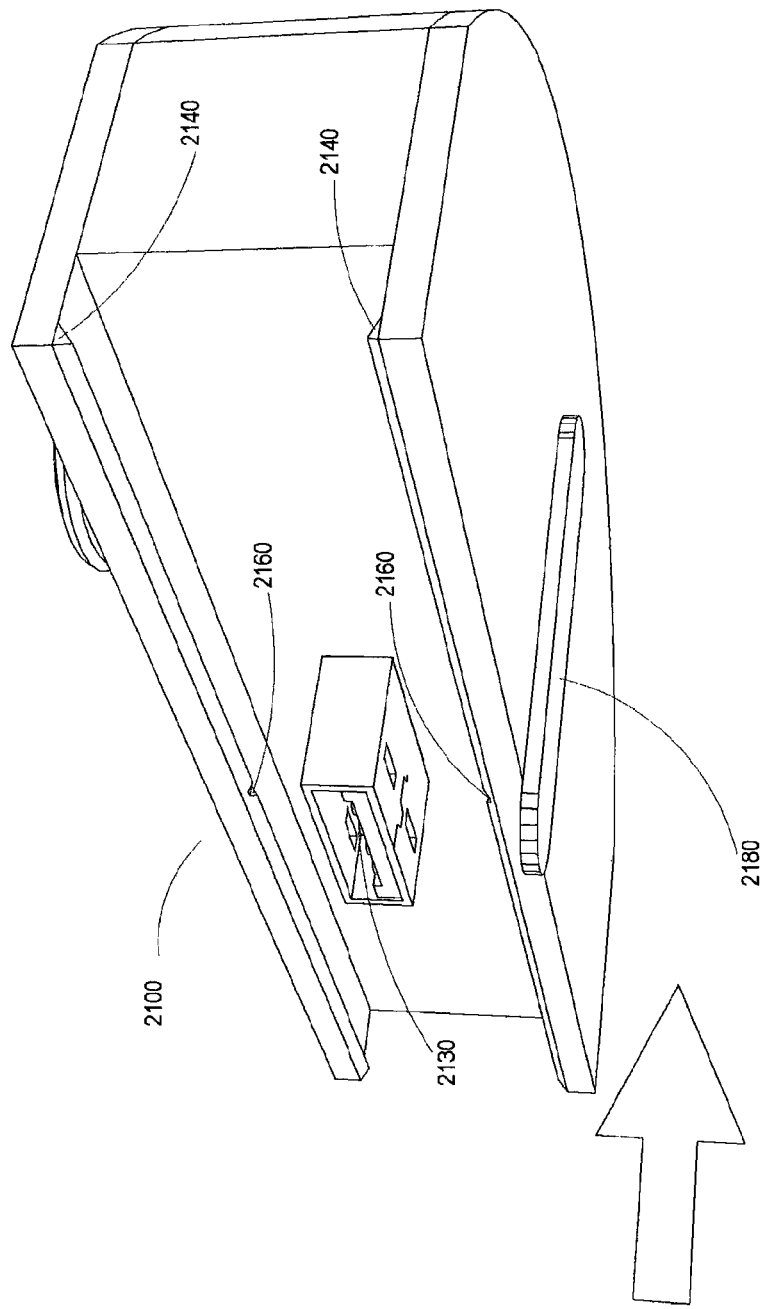
FIG. 17A illustrates a gaming accessory designed to be received by a portable computer system, with an integral sliding mechanism extended, according to an embodiment of the present invention.
Figure 17B:
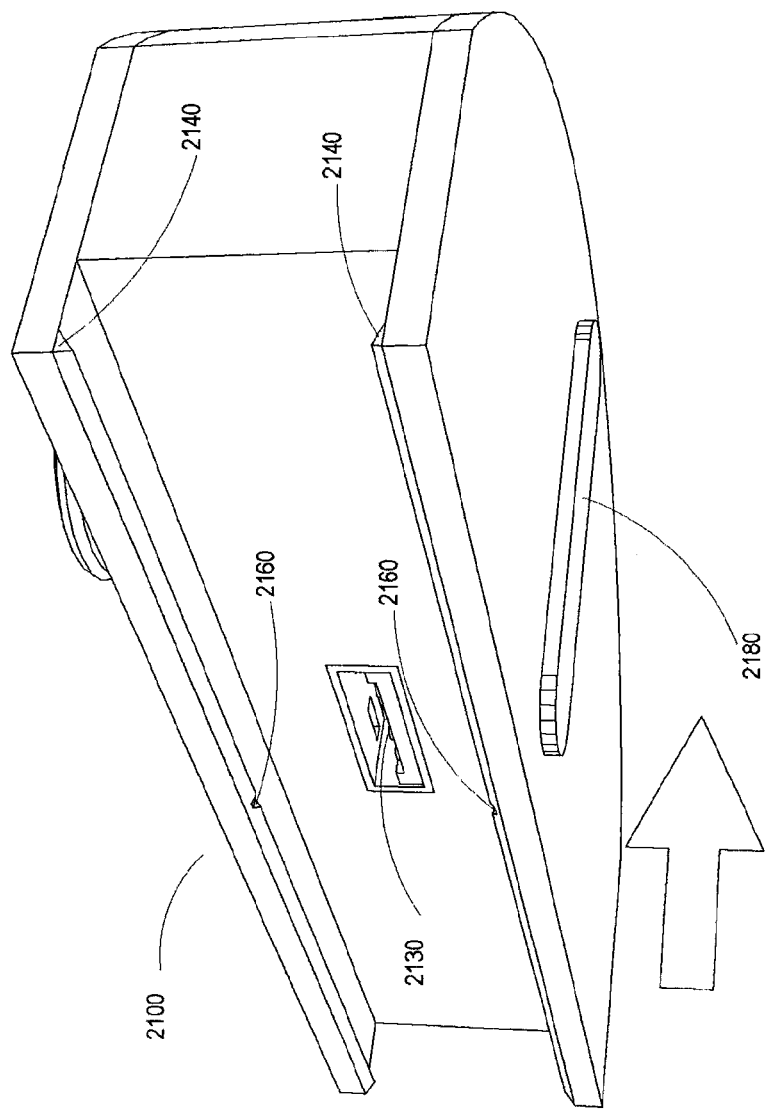
FIG. 17B illustrates a gaming accessory designed to be received by a portable computer system, with an integral sliding mechanism retracted, according to an embodiment of the present invention.
Figure 18:
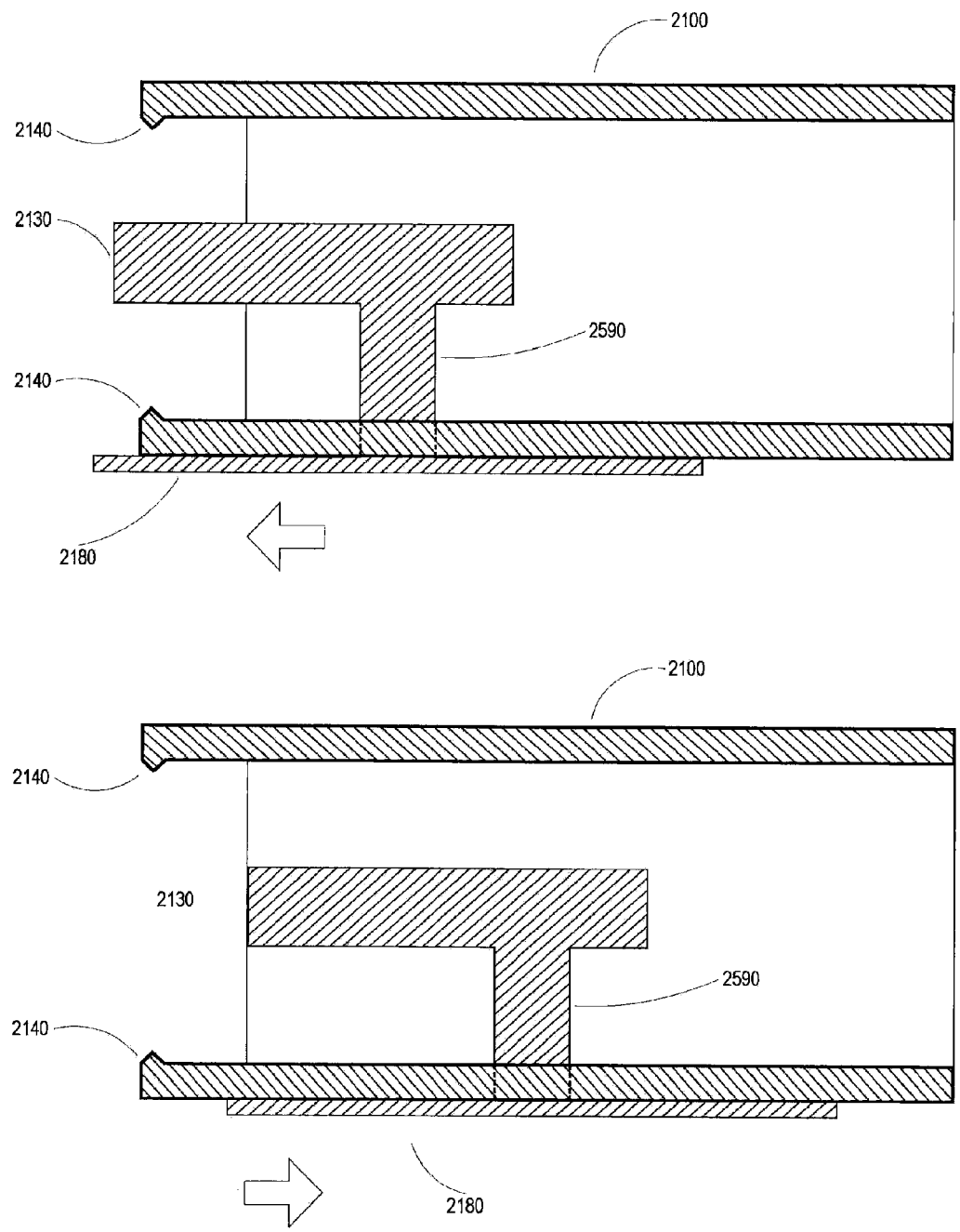
FIG. 18 illustrates a sliding mechanism, in both extended and retracted positions, according to an embodiment of the present invention.
Figure 19A:
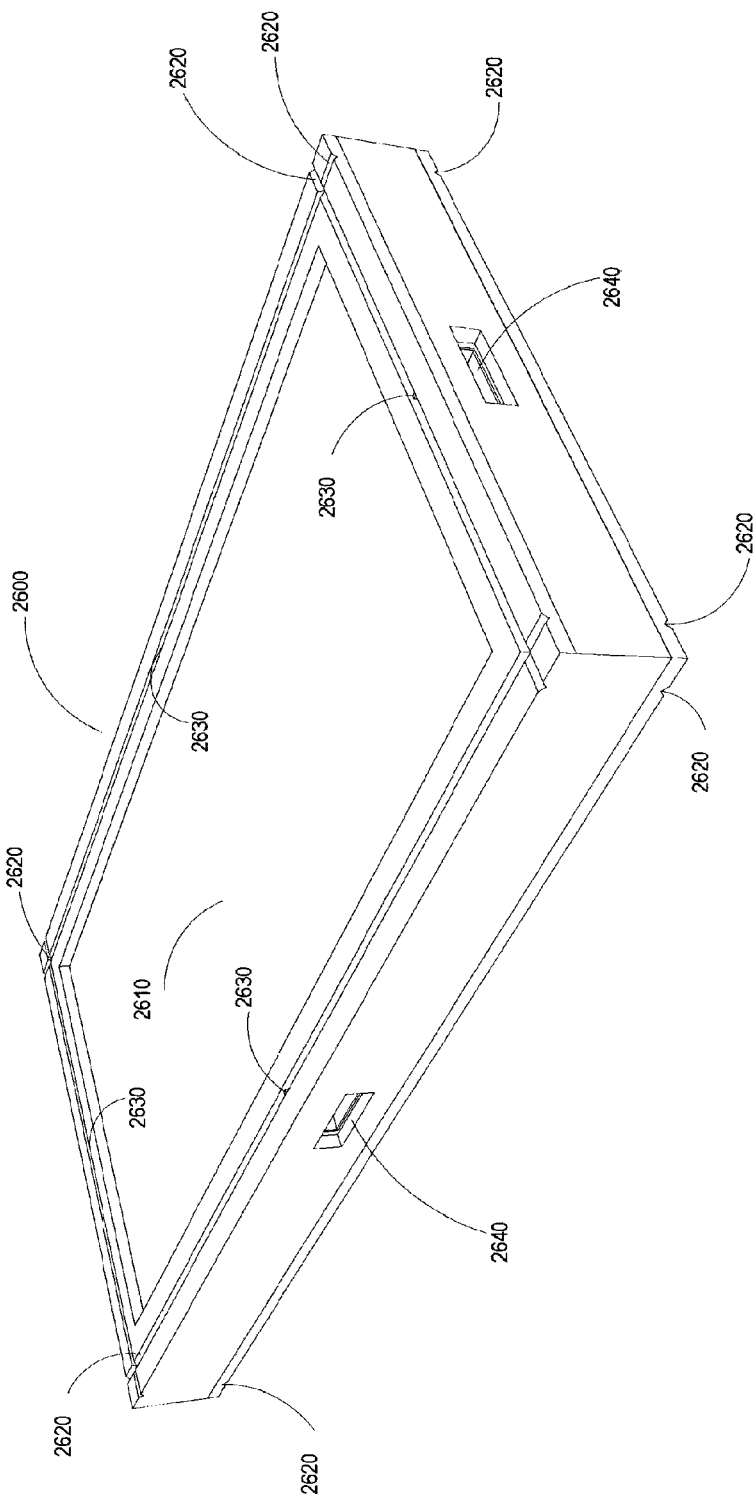
FIG. 19A is a front angled perspective view of a portable computer system, according to an embodiment of the present invention.
Figure 19B:
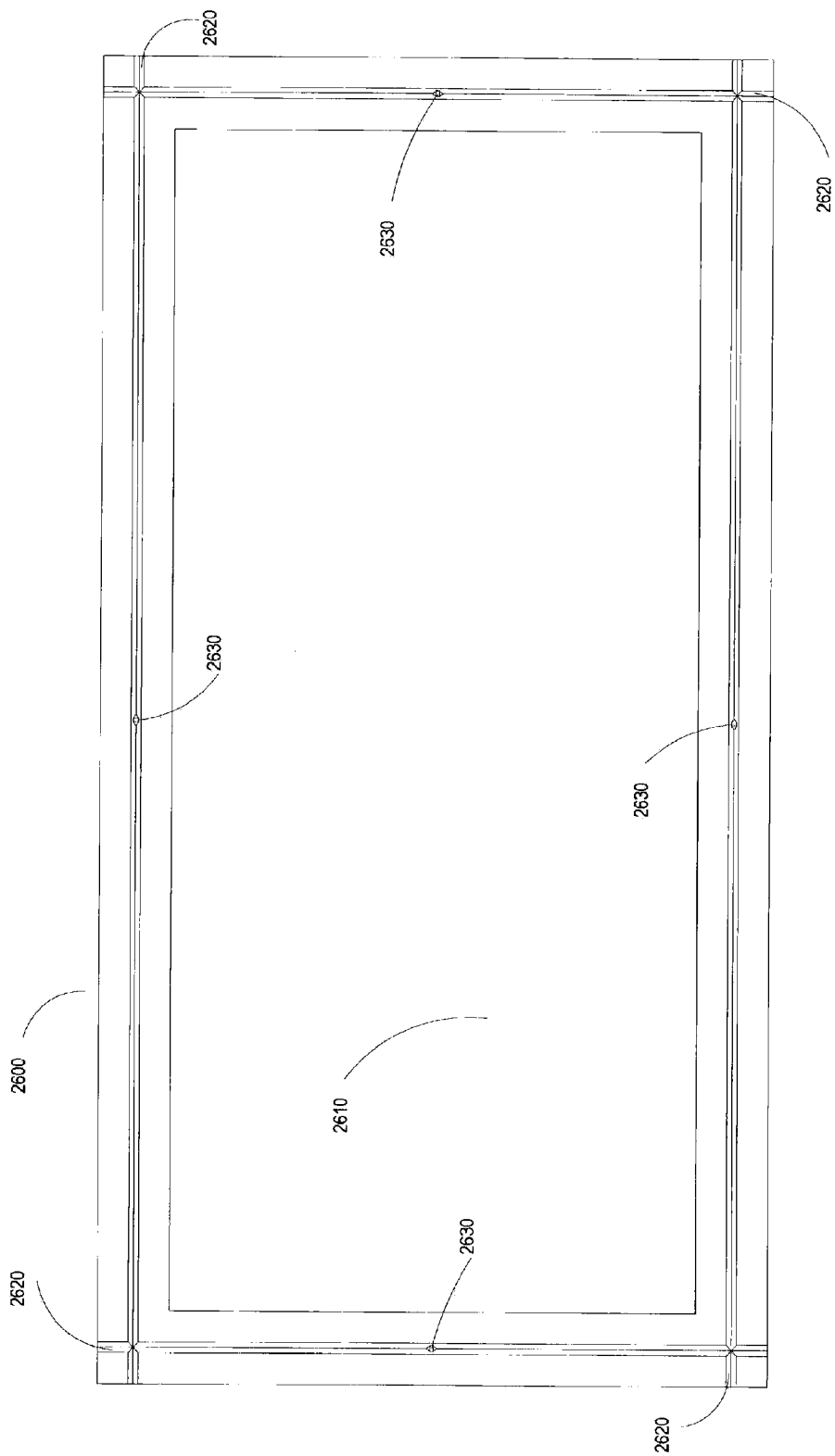
FIG. 19B is a top view of a portable computer system, according to an embodiment of the present invention.
Figure 19C:
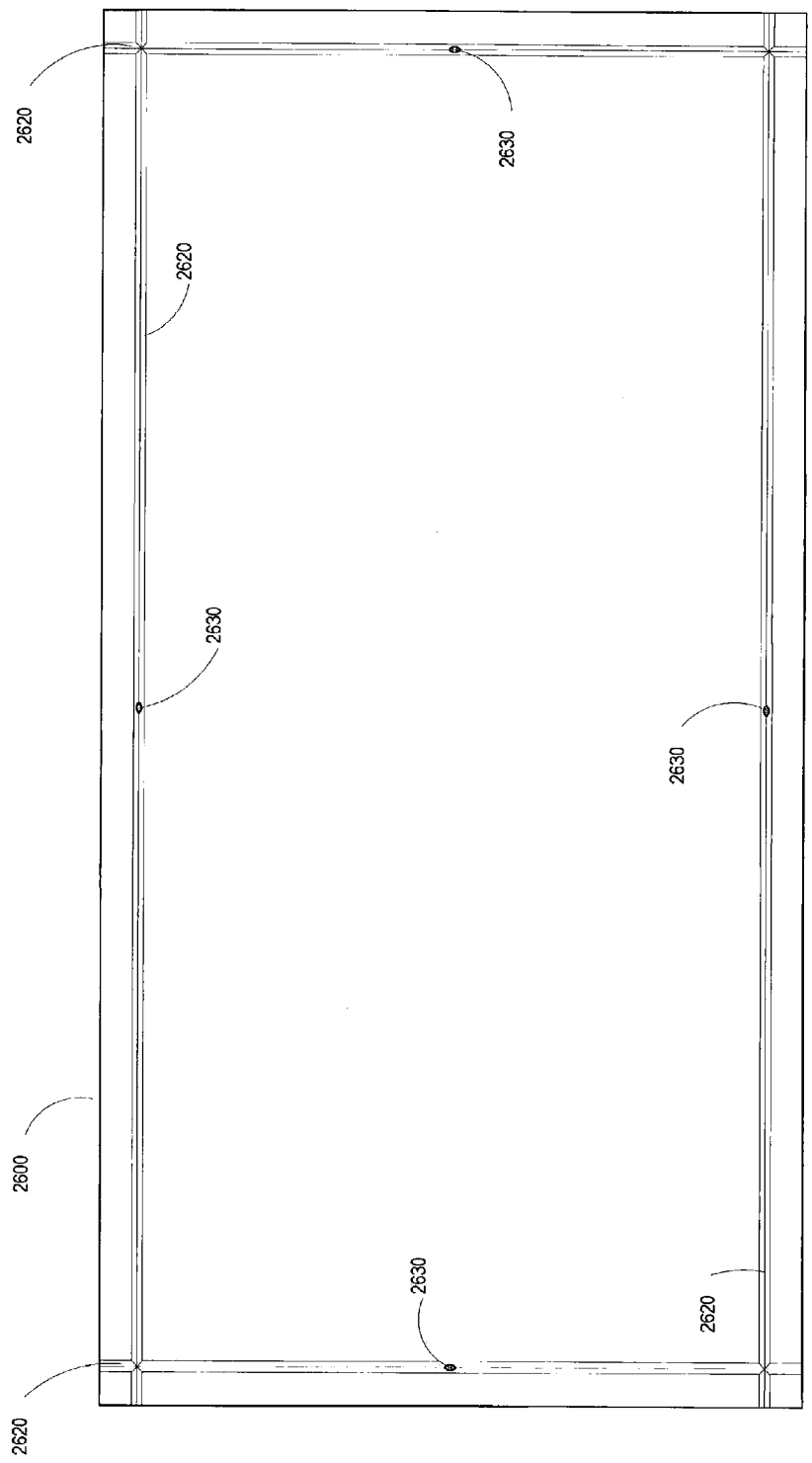
FIG. 19C is a rear view of a portable computer system, according to an embodiment of the present invention.
Figure 25:
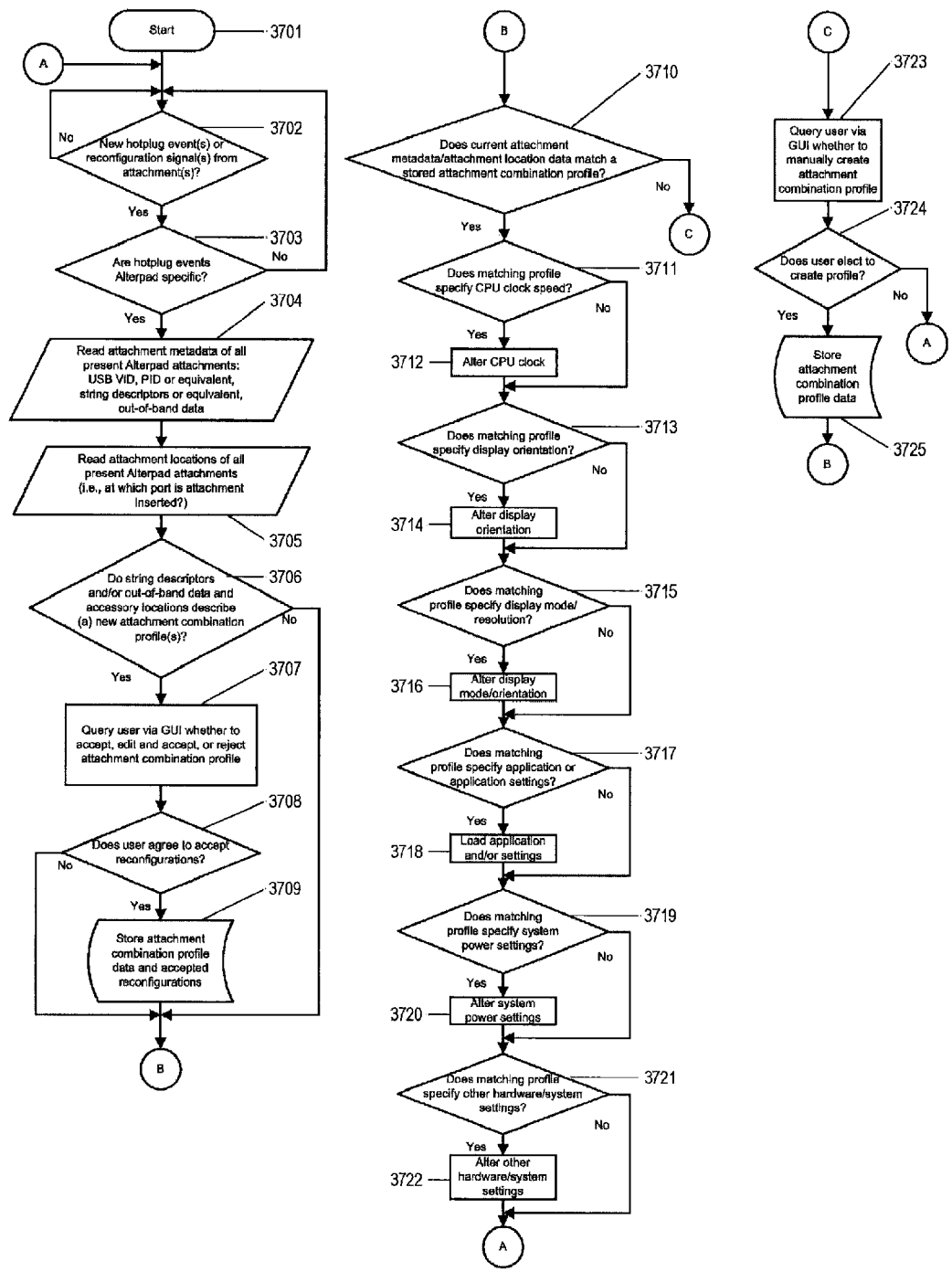
FIG. 25 is a flow diagram illustrating a process for reconfiguration of a portable computer system, according to an embodiment of the present invention.

In some embodiments of the invention, the communications connector 2130 may not be fixed, but instead may be retracted into the body of the accessory 2100 via slider 2180 or other suitable control, and extended again via the same mechanism. FIG. 17A illustrates such an embodiment with the communications connector 2130 in an extended position. FIG. 17B illustrates the communications connector 2130 in a retracted position. FIG. 25 is a partial cross-sectional view of an accessory 2100, where the first view illustrates a communications connector 2130 in an extended position and the second view illustrates the communications connector 2130 in a retracted position. The communications connector 2130 may be mated to the structure 2590, which may be mated to the slider 2180. Thus, manipulation of the slider 2180 may move the connector 2130 from the extended to the retracted position, from the retracted to the extend position, or to an intermediate position.

FIGS. 19A-19E illustrate a portable computer system, in various views, designed to receive accessories having connector groups similar to those of the gaming accessory 2100, according to an embodiment of the present invention. In this example, the portable computer system 2600 may include a touch screen display 2610 able to register contact between the screen and a pointing device such as a finger, stylus, etc. Also shown are communications ports 2640, one on each side of the portable computer system for four total in the pictured embodiment of the present invention, but any number of various communications ports may be provided. In some embodiments of the present invention communications ports 2640 may be USB 2.0 ports, but could alternatively be any of a number of well-known communications standards and protocols such as, e.g., parallel, SCSI, Firewire, Ethernet, etc.

In some embodiments the portable computer system 2600 may include receiving retention channels 2620, which may receive an accessory via retention tongues 2140 as illustrated in FIGS. 16A-17B and FIG. 18. Additionally, in some embodiments of the present invention, retention elements 2630 may be located in line with communications ports 2640. In the illustrated embodiments, 8 retention elements 2630 are shown, but other quantities of retention elements 2630 are possible. The retention elements 2630 may be constructed of metal or other electrically conductive material in some embodiments. The retention elements 2630 may be provided in opposable pairs, may be spring loaded, and may be shaped to retract and then extend into retention cutouts 2160 illustrated in FIGS. 16A-17B. Various embodiments may provide any number of such retention elements 2630 to allow for any number of accessories to be attached to a portable computer system.

Figure 20A:
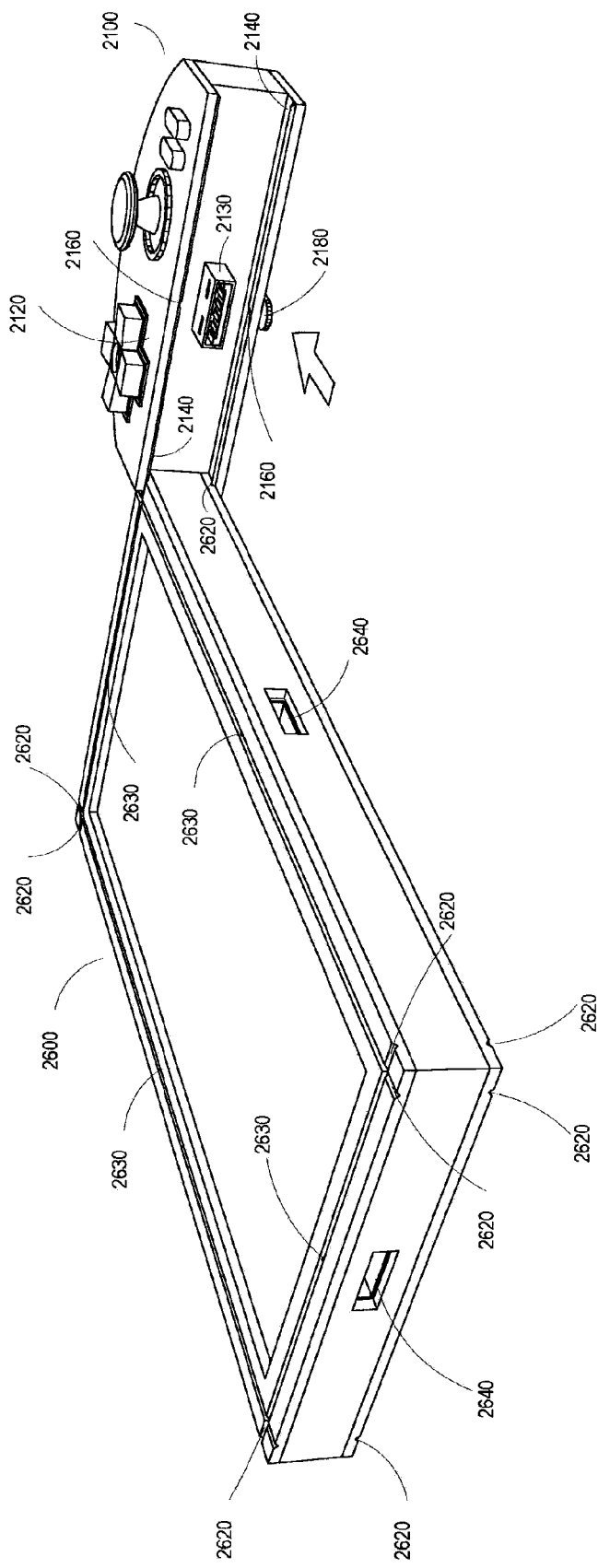
FIG. 20A illustrates a portable computer system configured to receive a game accessory with integral sliding mechanism extended, according to an embodiment of the present invention.
Figure 20B:
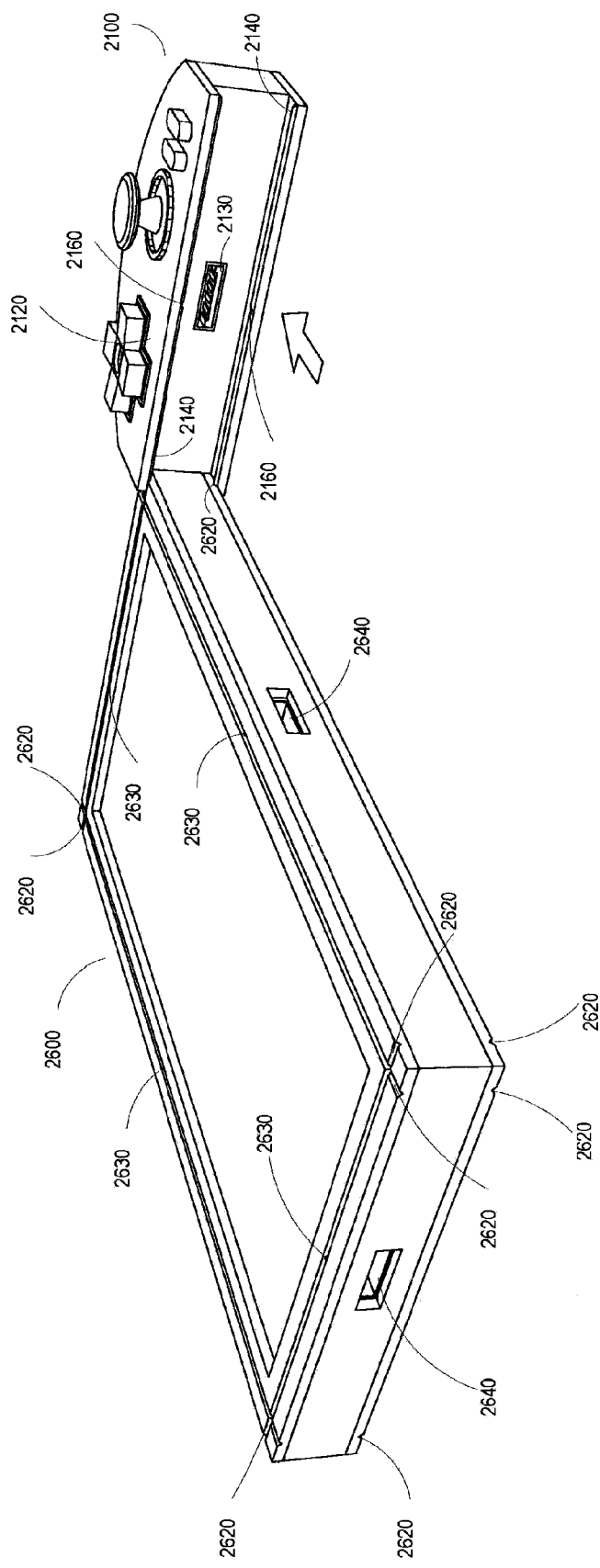
FIG. 20B illustrates a portable computer system configured to receive a game accessory with integral sliding mechanism retracted, according to an embodiment of the present invention.
Figure 20C:
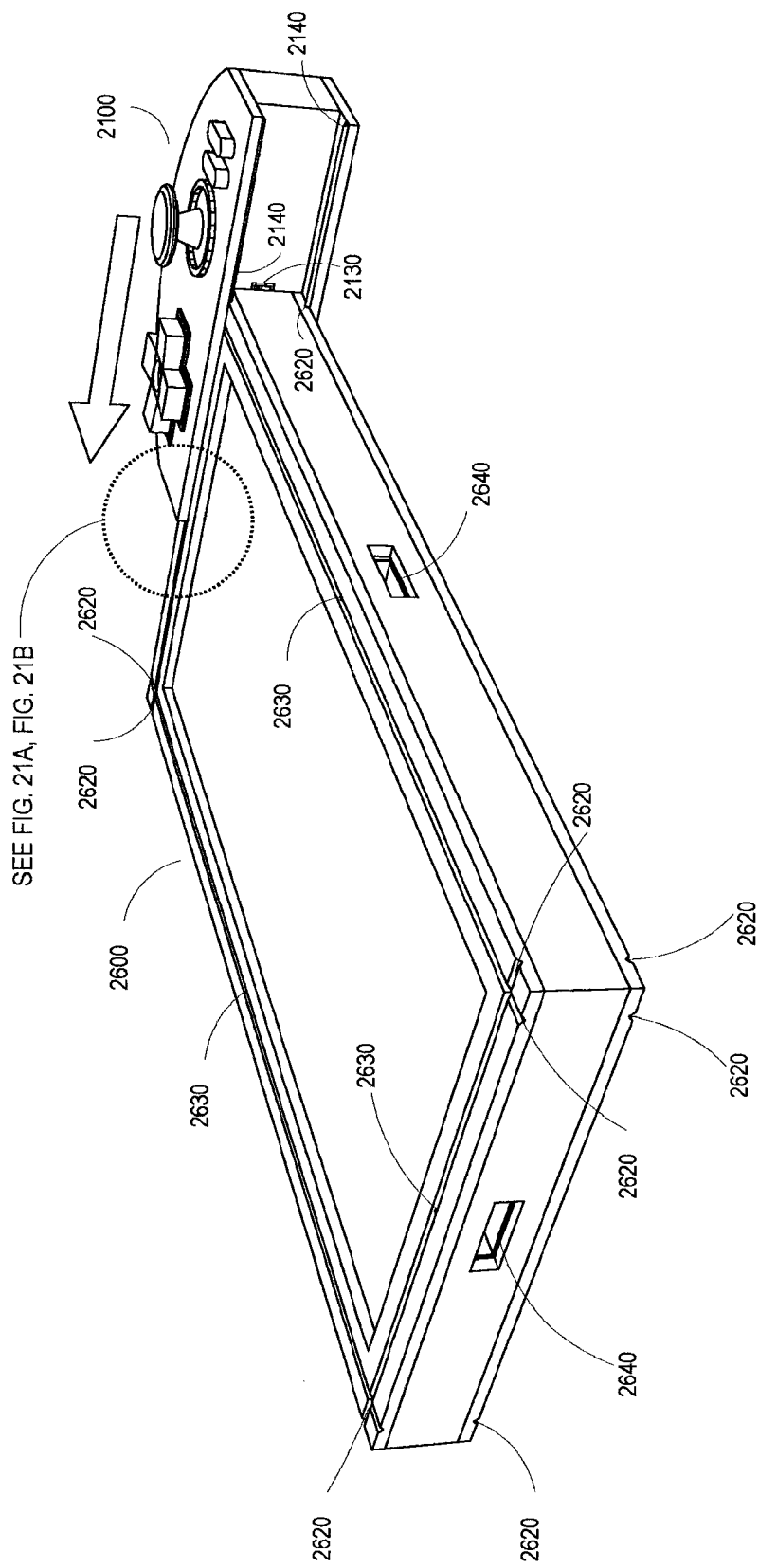
FIG. 20C illustrates a portable computer system configured to receive a game accessory, according to an embodiment of the present invention.

FIGS. 20A-34B illustrate a portable computer system configured to receive, and become integrally engaged with, a game accessory according to an embodiment of the present invention. In FIG. 20A the portable computer system 2600 may include retention channels 2620 that may accept retention tongues 2140 of an accessory 2100 in a lateral fashion. In FIG. 20B a slider 2180 may be pushed forward, which may cause a communications connector 2130 to retract into the body of the accessory. FIG. 20C illustrates a lateral force being applied after a retraction of the communications connector 2130 such that the retention tongues 2140 of the accessory 2100 may be received by the retention channels 2620 in a sliding motion.

Figure 21A:
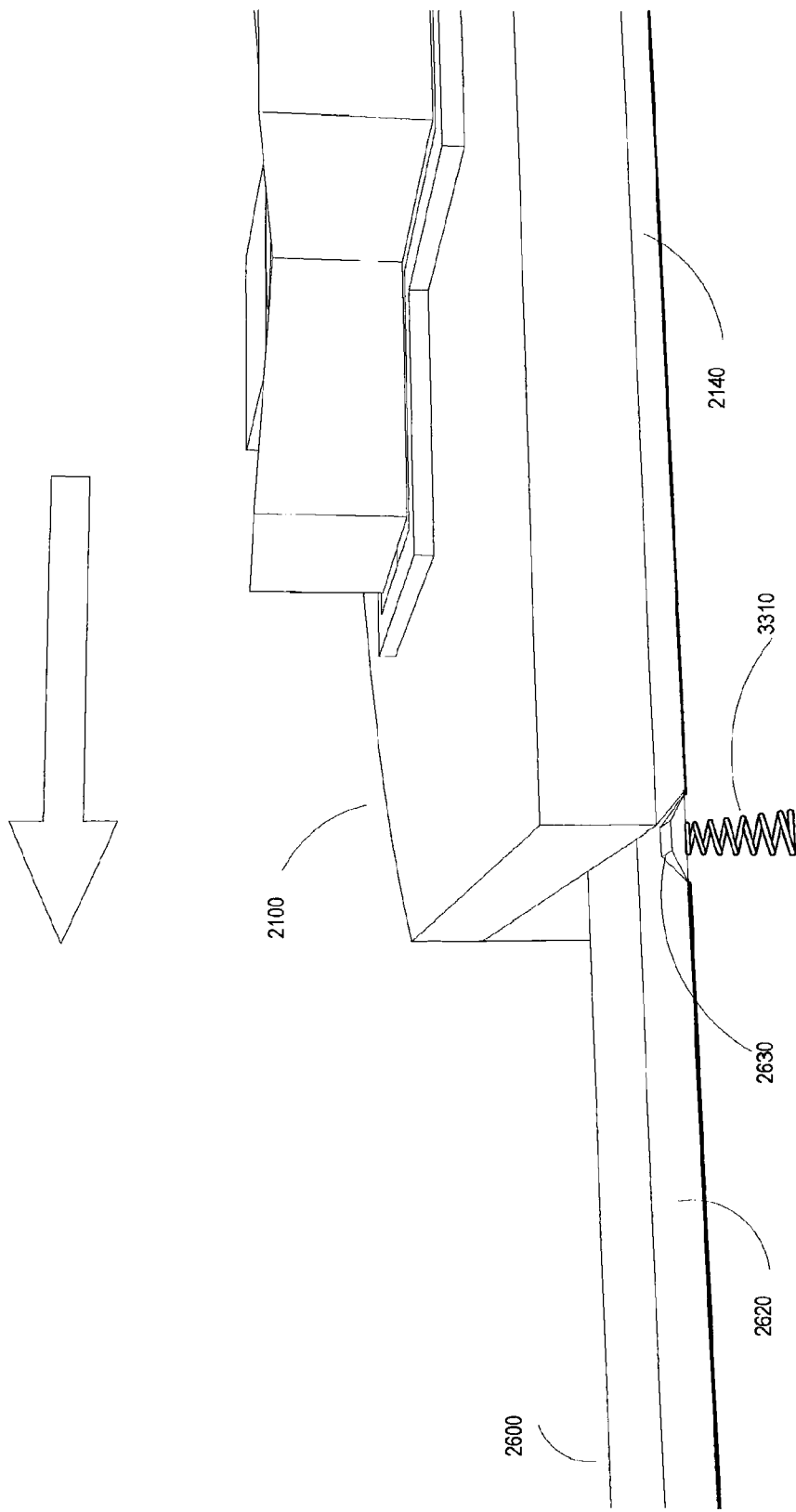
FIG. 21A is a partially broken view of a spring-loaded retention mechanism, fully extended, according to an embodiment of the present invention.
Figure 21B:
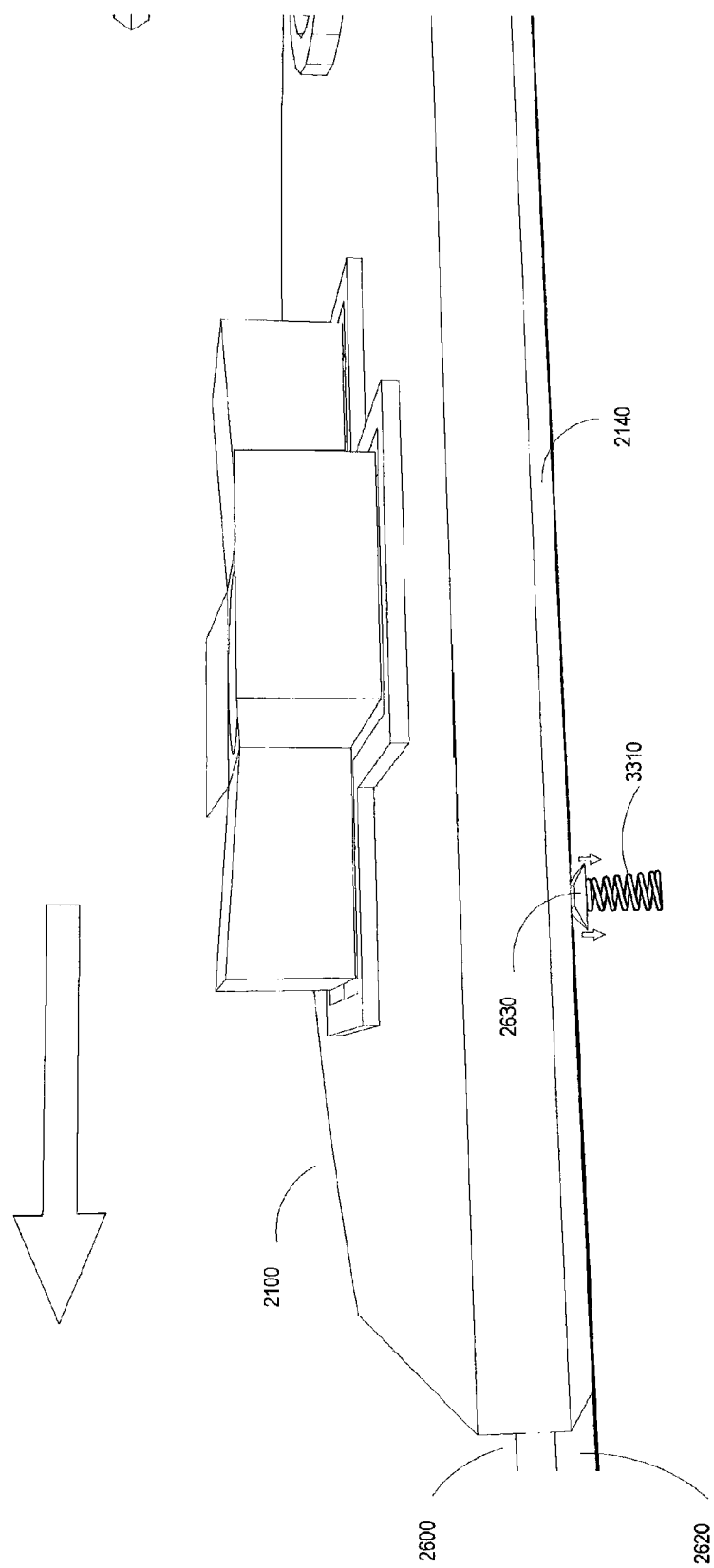
FIG. 21B is a partially broken view of a spring-loaded retention mechanism, depressed, according to an embodiment of the present invention.

FIGS. 21A and 21B are detailed partially broken views of an accessory 2100 being received by a portable computer system 2600, taken along line 21A of FIG. 20C, according to an embodiment of the present invention. In FIG. 21A the retention element 2630 is in a fully extended position from the force of retention spring 3310, as the accessory 2100 has not made physical contact with the retention element 2630. The retention element 2630 and the leading edge of the retention tongue 2140 may have complimentary sloped shapes. Lateral force applied to the accessory 2100 may cause the retention element 2630 to become depressed. FIG. 21B illustrates a retention element 2630 in a depressed state which may be the result of a lateral force applied to the sloped leading edge of retention tongue 2140 and/or the accessory 2100 which contains the retention tongue 2140.

Figure 22:
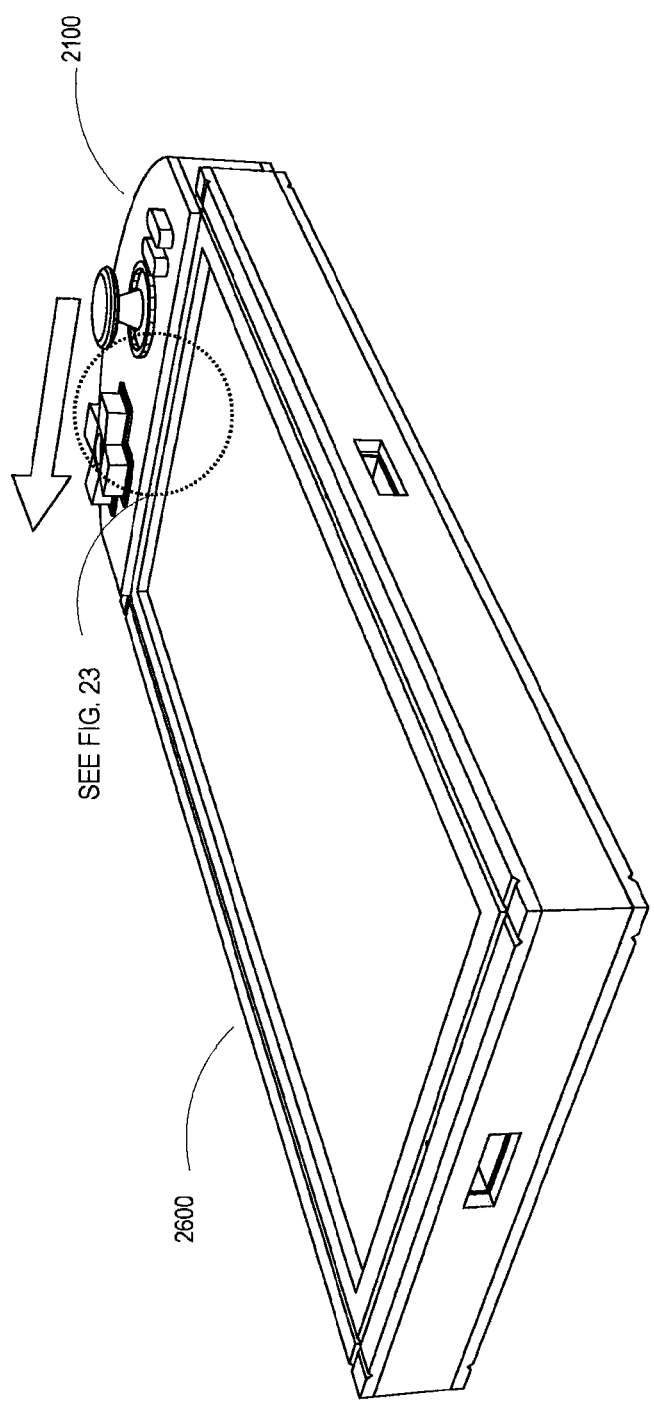
FIG. 22 illustrates a portable computer system integrally engaged with a game accessory, according to an embodiment of the present invention.
Figure 23:
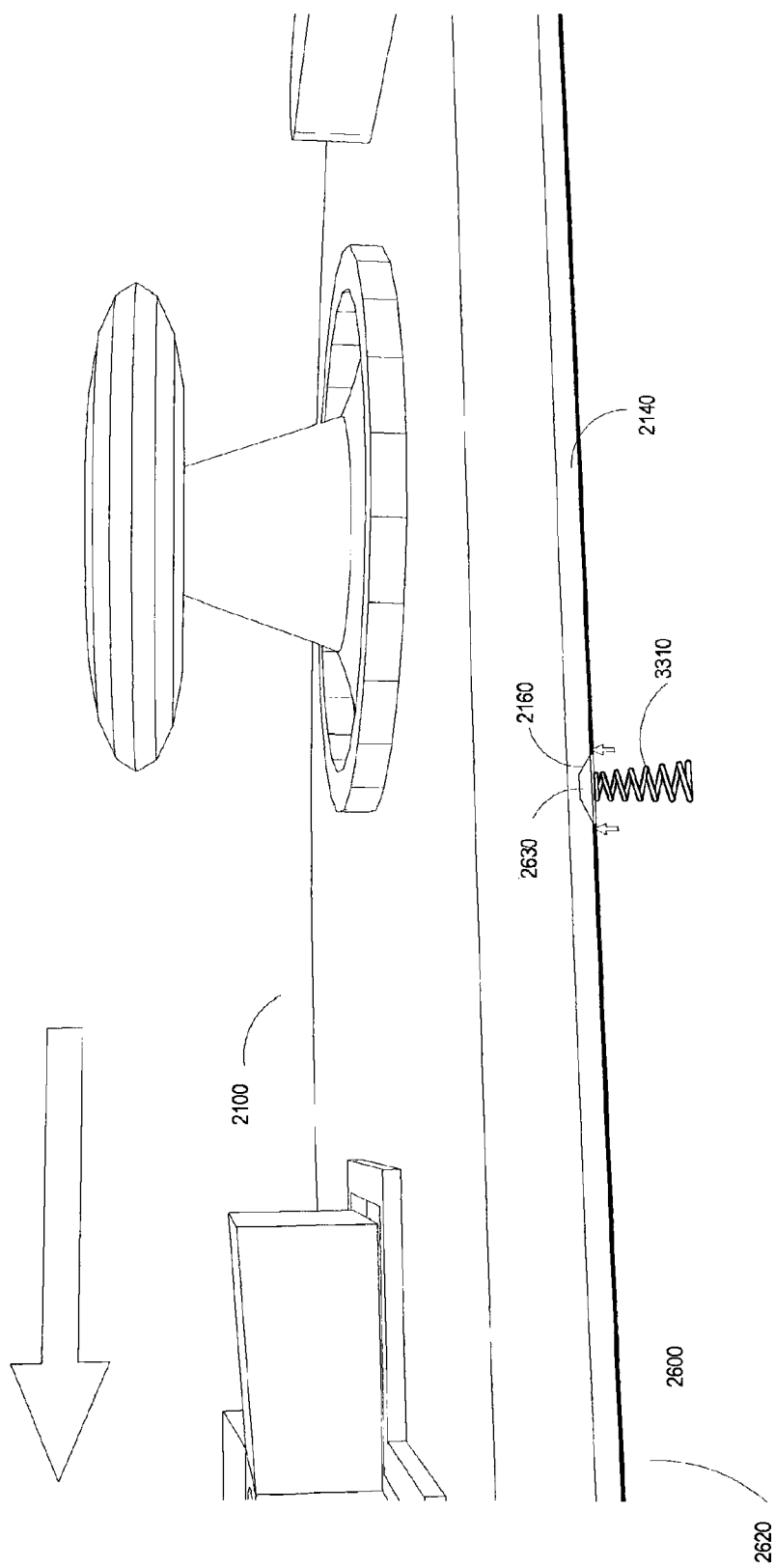
FIG. 23 is a partially broken view of a spring-loaded retention mechanism, fully extended into a receiving cut-out of an accessory, according to an embodiment of the present invention.

FIG. 22 illustrates an accessory 2100 engaged with a computer system 2600. FIG. 23 is a detailed partially broken view of the accessory 2100 engaged with the computer system 2600, taken along line 23 of FIG. 22, according to an embodiment of the present invention. In FIG. 23, further lateral force may have been applied such that the retention element 2630 may be placed in a fully extended position by the force of the spring 3310. The force of the spring 3310 may propel the retention element 2630 into the retention cutout 2160, which may be shaped to receive the retention element 2630.

The retention element 2630, retention tongue 2140 and retention cutout 2160 may be shaped such that the extension of retention element 2630 and the use of spring 3310 may provide a tactile response to a user. The user may use this tactile response to determine when to cease applying lateral force during the engagement process of the accessory 2100 and computer system 2600, because the retention element 2630 may extend when the cutout 2160 is in an engaged position. The spring 3310 may also keep the retention element 2630 firmly pressed against the retention cutout 2160 such that both, if constructed of metal or other electrically conductive material, may be part of a circuit. As with the previous embodiment of retention mechanism illustrated in FIGS. 1-8 and elsewhere, pairs of accepting and receiving retention devices may enable electrical energy transfer and/or low-bandwidth signaling between the attached devices.

Figure 24A:
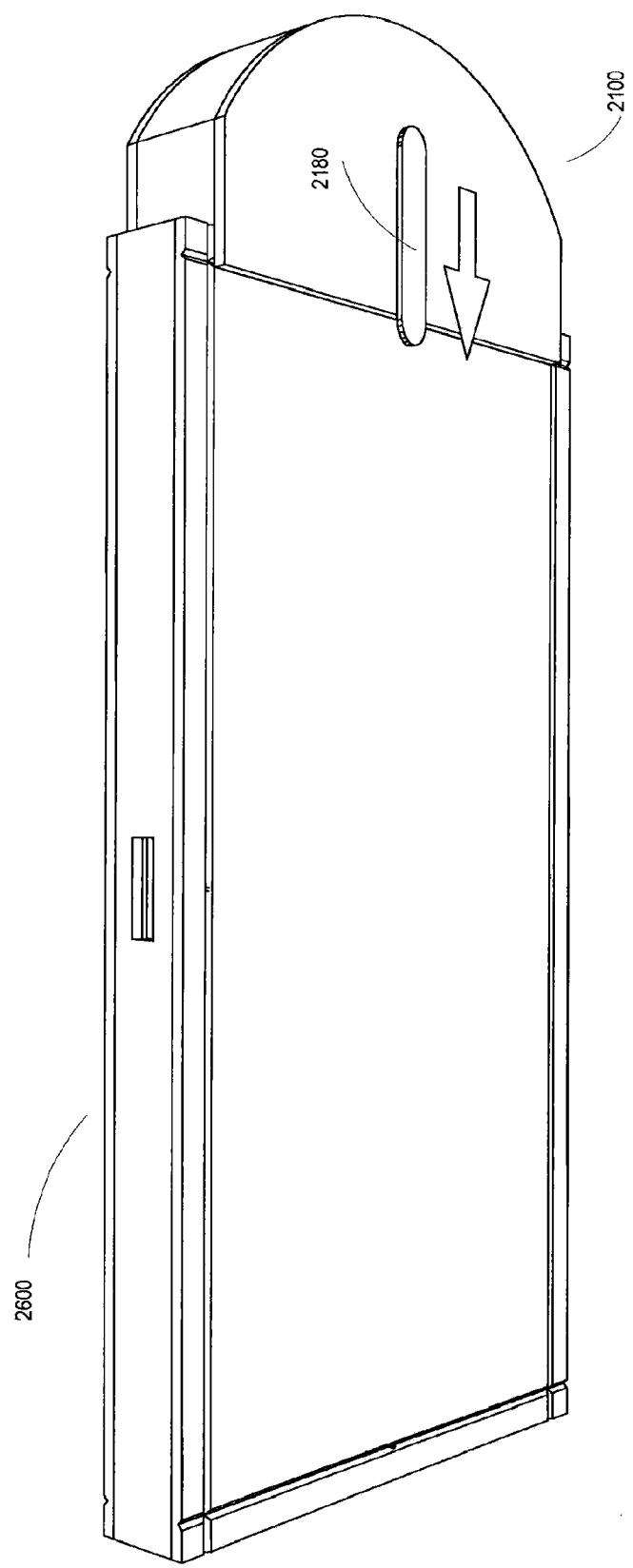
FIG. 24A illustrates a portable computer system integrally attached to a game accessory, according to an embodiment of the present invention.
Figure 24B:
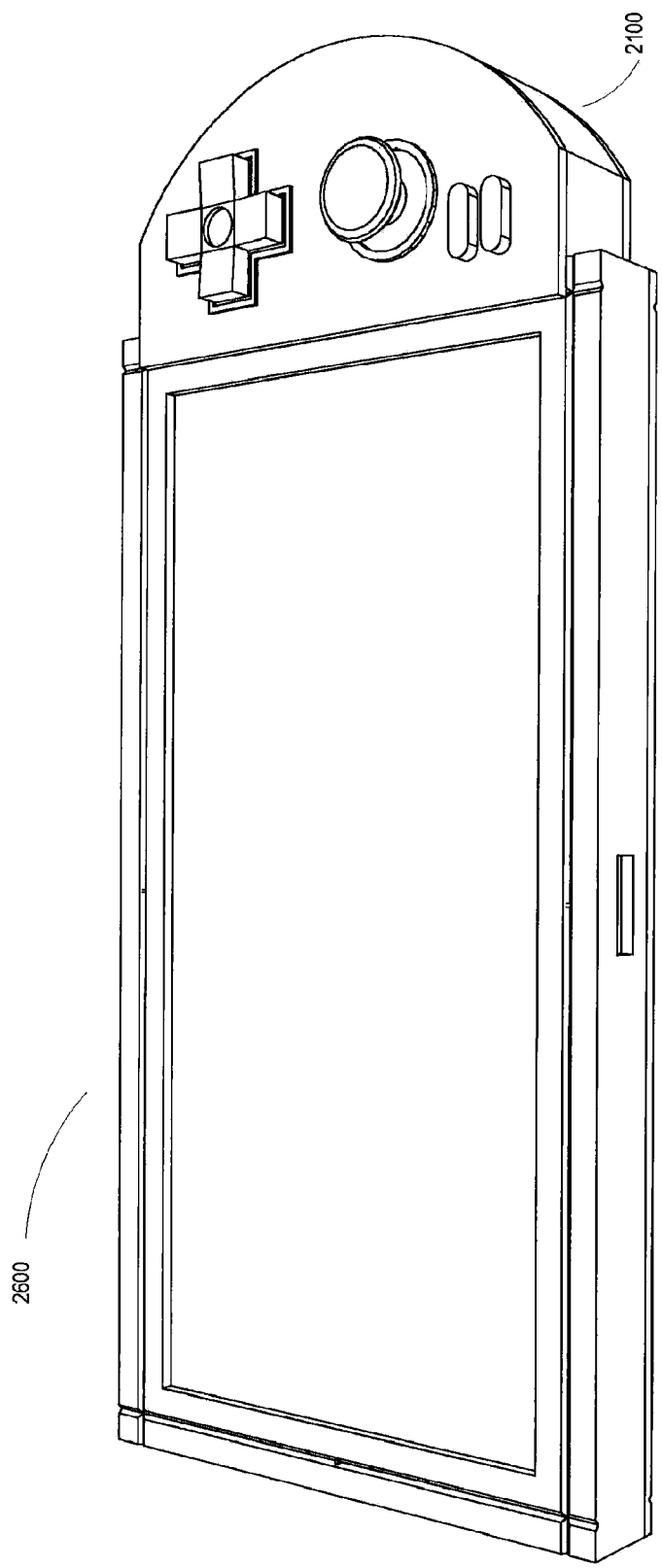
FIG. 24B illustrates a portable computer system integrally attached to a game accessory, according to an embodiment of the present invention.

FIGS. 24A and 34B illustrate a portable computer system 2600 integrally attached to an accessory 2100, according to an embodiment of the present invention. Fully integral attachment may be achieved when a slider 2180 is moved into an extended position. As previously illustrated in FIGS. 17A-18 and FIGS. 20A and 20B, this action may cause a communications connector to move into an extended position from the accessory 2100, where it may become inserted into a communications port located on the body of the computer system 2600. The slider 2180 may also be employed as a secondary structural support through the use of a tab on the underside.

FIG. 25 is a flow diagram illustrating a process for reconfiguration of a portable computer system based on insertion, configuration, and relative location of accessory devices, according to an embodiment of the invention. The sample process 3700 may be performed by a processing logic that may compromise hardware (circuitry, dedicated logic, etc.), software, or a combination of both. Referring to FIG. 25, at block 3702, an attachment, removal, reconfiguration, or other event for an accessory device may be detected via an event generated by an operating system kernel (referred to as a "hotplug" event), or alternately, via a running software daemon for the purpose of monitoring signaling from an attachment device. The portable computer system may be configured such that a hotplug event may be synthesized for a device that is attached when the portable computer system's operating system is booted. In another embodiment of the present invention, a software timer may be incorporated into block 3702, so that a user may remove and/or attach multiple accessories before logic proceeds to block 3703.

At block 3703, the type of accessories or peripherals generating the event may be determined. Accessories may be configured specifically for use with the computer system or they may be generic accessories. Both types of accessories may include or lack retention elements. For example, in some embodiments the type (system specific or generic) may be determined by reading identifying data contained in a storage in the current accessory devices via standard well-known communications standards and protocols, depending upon communications technology being employed (e.g., a PID and/or device descriptor for USB based devices, a mode page code for SCSI based devices, EDID information for HDMI attached devices, etc.). In some embodiments the identifying data may include configuration directives and conditions encoded in interpreted computer language on the accessory peripheral device. In some embodiments the type may be determined by reading "out of band" data via low-bandwidth signaling through the retention elements, or by detecting the electrical presence of retention elements. In some embodiments, at block 3703, in the case of removal hotplug events, a database at block 3709 may be queried to determine the type of accessory that was removed. In some embodiments of the present invention, a component of the underlying operating system may determine the type of accessory that was removed. If it is determined that all hotplug events were not specific, the event may be ignored, and processing logic may return to block 3702. If it is determined that some or all hotplug events were system specific, processing logic may proceed to block 3704.

At block 3704, attachment device metadata of all present system specific accessories may be read. In some embodiments of the present invention, some of the metadata contained within a system specific accessory may include an encoded description of directives, conditional or otherwise, for altering operating parameters and configuration of a portable computer system. For example, a gaming accessory's metadata may contain a directive to change display orientation if it and another gaming accessory are inserted in specific locations on the portable computer system. In some embodiments, these and other directives and conditions may be encoded in a standardized markup based language, e.g., according to a specific XML schema. In other embodiments, they may be encoded in an interpreted computer language such as Lua, Tcl, or Fig. The encoded conditions and directives may be ascertained by reading identifying data contained in non-volatile storage by the accessory device via standard well-known communications standards and protocols, depending upon communications technology being employed (e.g., string descriptors for USB based devices, an EDID Vendor Specific Data Block for HDMI attached devices, etc.). In some embodiments, an accessory may have multiple communications interfaces and be attachable to the computer system using a variety of different communications ports. For example, both the computer system and the accessory may have USB and Firewire connections (or other combinations) available, and the computer system and accessory may be attached with either a USB or Firewire connection. The computer system may read attachment device metadata from either connection. In other embodiments, the metadata may be dependent on the type of communications technology being used. For example, different metadata may be used for the same accessory depending on whether it is attached to the computer through a USB, Firewire, HDMI, or other connection. In other embodiments of the present invention the conditions and directives may be communicated through low-bandwidth signaling via the retention elements of various embodiments previously illustrated.

At block 3705, the attachment accessory locations relative to the portable computer system may be determined by reading the communications port IDs that currently have system specific accessories inserted. These locations, combined with the directives and conditions read from the present system specific accessories, may make up in aggregate an attachment combination profile. In various embodiments, the attachment combination profile may only include the directives and conditions, only the locations, a combination of subsets of each, or all of the location, directive, and condition data. In some embodiments of the invention, attachment combination profiles may be added to a central database during the process of installing software applications on the portable computer device and/or via a profile editor application. The attachment combination profiles may also by stored within dedicated electronic files, which may allow them to be shared by different users of the same type of portable computer system.

At block 3706, it may be determined whether the current attachment combination profile is new or if it has previously existed for a particular portable computer system. This determination may be made by querying the database at block 3709 or a component of the underlying operating system may make the determination. If the current attachment combination profile is new, processing logic may proceed to block 3707. If it is not new, processing logic may proceed to block 3710.

At block 3707, the system may prompt a user for input if a new attachment combination profile is detected. In some embodiments of the invention, the system may present the user with an on-screen representation or preview of how the directives contained within the new attachment combination profile may reconfigure the portable computer system. The user may accept the suggested reconfigurations, edit the reconfigurations according to user preferences and accept, or reject the suggested reconfigurations.

At block 3708, if the user rejects the suggested reconfigurations, processing logic may proceed to block 3710. If the user accepts the suggested reconfigurations, or edits and accepts the suggested reconfigurations, processing logic may proceed to block 3709.

At block 3709 the current attachment combination profile and the portable computer reconfiguration parameters may be stored in a database. In this fashion, a history of various attachment combination profiles may be stored, along with resulting reconfiguration parameters. The database may be queried for a history of all system specific accessories that have been attached to the portable computer system, allowing for previously illustrated logic to determine that a system specific accessory had been present and then removed. Processing logic may proceed to block 3710.

At block 3710, the present attachment combination profile may be compared to the database of attachment combination profiles. If the current attachment combination profile is not present in the database, processing logic may proceed to block 3723. If the present attachment combination profile is present in the database, processing logic may proceed to block 3711.

At blocks 3711, 3713, 3715, 3717, 3719 and 3721 the current attachment combination profile's various directives may be applied such that the portable computer system is reconfigured in various fashions, e.g., CPU clock speed, display orientation, mode of display in the case of multiple mode displays (which may include resolution, color depth, backlighting, reflectiveness, etc.), software application instantiation and execution, reconfiguration of presently executing software applications, power properties (such as voltage reduction or increase), access to memory, access to storage, and other operational parameters may be adjusted. Also, in some embodiments of the present invention, other hardware or system settings may be altered. Processing logic may proceed to block 3702, with the software daemon awaiting another hotplug event.

If the current attachment combination profile is not present in the database at block 3710, logic may proceed to block 3723. At block 3723, the system may prompt the user for input. In one embodiment of the invention, the user may be presented with an on-screen representation or preview of how the directives contained within the new attachment combination profile would reconfigure the portable computer system, similarly to the process of block 3708. At block 3723, the preview may allow the user to create an entirely new set of reconfiguration directives according to user preferences. The user may create and accept a set of reconfiguration directives or reject the entire process. In the case where the user creates a new set of reconfiguration directives, the directives may be stored in a database at block 3725. This database may be the same database as that used in block 3709 in some embodiments. Processing logic may proceed to block 3710.

If the user rejects the creation of a set of reconfiguration directives, processing logic may proceed to block 3702. In this case the originating hotplug event may be ignored, and the portable computer system's overall configuration may remain unchanged.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the, applicant's intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

What is claimed is:

1. A method for configuring computer operational parameters comprising:
    detecting with at least one processor at least one peripheral device in communication with the at least one processor;
    receiving, with the at least one processor from at least one of a plurality of communication ports constructed and arranged to interface with the at least one peripheral device, data about the at least one peripheral device, the data comprising at least one location of the at least one peripheral device relative to the computer;
    reading with the at least one processor the peripheral device data to identify at least one profile; and
    adjusting at least one operational parameter of the at least one processor based on the at least one profile.

2. The method of claim 1, wherein the reading comprises searching at least one database in communication with the at least one processor for the at least one profile.

3. The method of claim 2, wherein the reading further comprises creating the at least one profile and storing the at least one profile in the at least one database when the at least one profile is not found in the at least one database when the at least one database is searched.

4. The method of claim 1, wherein the reading comprises creating the at least one profile based on the peripheral device data.

5. The method of claim 1, further comprising:
transmitting to at least one display information about the peripheral device data and/or the at least one profile;
receiving from at least one input device or the at least one peripheral device at least one user-created profile; and
storing the at least one user-created profile in the at least one database.

6. The method of claim 5, further comprising:
adjusting the at least one operational parameter based on the at least one user-created profile.

7. The method of claim 1, further comprising:
transmitting to at least one display information about the at least one profile;
receiving from at least one input device or the at least one peripheral device a selected profile selected from the at least one profile; and
adjusting the at least one operational parameter based on the selected profile.

8. The method of claim 1, further comprising:
selecting a specific profile from a plurality of profiles in the at least one database; and
adjusting the at least one operational parameter based on the specific profile.

9. The method of claim 1, further comprising transmitting data to the at least one peripheral device.

10. The method of claim 1, further comprising establishing at least one electrical connection between at least one power supply in communication with the at least one processor and at least one peripheral power supply disposed in the at least one peripheral device.

11. The method of claim 1, wherein the at least one operational parameter comprises at least one clock speed of the at least one processor, at least one secondary clock speed for at least one secondary processor, at least one utilization of at least one memory, at least one utilization of at least one storage, at least one orientation of at least one display, at least one display mode of the at least one display, and/or at least one power setting of at least one power supply.

12. The method of claim 1, wherein the peripheral device data further comprises at least one sensor reading from at least one sensor disposed in the at least one peripheral device, at least one hardware identity of the at least one peripheral device, and/or at least one communication port type.

13. The method of claim 1, wherein the at least one peripheral device comprises at least one game controller; at least one camera; at least one keyboard; at least one control panel; at least one vehicle; at least one global positioning system receiver; and/or at least one memory device.

14. The method of claim 1, wherein the adjusting is further based upon to which of the plurality of communication ports two or more of the peripheral devices are connected.

15. A computer comprising:
at least one processor;
at least one database in communication with the at least one processor; and
a plurality of communication ports in communication with the at least one processor constructed and arranged to interface with at least one peripheral device;
wherein the at least one processor is constructed and arranged to detect the at least one peripheral device when the at least one peripheral device interfaces with at least one of the plurality of communication ports; receive peripheral device data from the at least one of the plurality of communication ports, the data comprising at least one location of the at least one peripheral device relative to the computer; read the peripheral device data to identify at least one profile; and adjust at least one operational parameter of the at least one processor based on the at least one profile.

16. The computer of claim 15, wherein the reading comprises searching the at least one database for the at least one profile.

17. The computer of claim 16, wherein the reading further comprises creating the at least one profile and storing the at least one profile in the at least one database when the at least one profile is not found in the at least one database when the at least one database is searched.

18. The computer of claim 15, wherein the reading comprises creating the at least one profile based on the peripheral device data.

19. The computer of claim 15, wherein the at least one processor is further constructed and arranged to create the at least one profile, store the at least one profile in the at least one database, and adjust the at least one operational parameter based on the at least one profile when the at least one profile is not found in the at least one database when the at least one database is searched.

20. The computer of claim 15, further comprising:
at least one display in communication with the at least one processor; and
at least one input device in communication with the at least one processor;
wherein the at least one processor is further constructed and arranged to transmit to the at least one display information about the peripheral device data and/or the at least one profile;
receive from the at least one input device at least one user-created profile; and store the at least one user-created profile in the at least one database.

21. The computer of claim 20, wherein the at least one processor is further constructed and arranged to adjust the at least one operational parameter based on the at least one user-created profile.

22. The computer of claim 15, further comprising:
at least one display in communication with the at least one processor;
wherein the at least one processor is further constructed and arranged to transmit to the at least one display information about the peripheral device data and/or the at least one profile;
receive from the at least one peripheral device at least one user-created profile; and store the at least one user-created profile in the at least one database.

23. The computer of claim 22, wherein the at least one processor is further constructed and arranged to adjust the at least one operational parameter based on the at least one user-created profile.

24. The computer of claim 15, further comprising:
at least one display in communication with the at least one processor; and
at least one input device in communication with the at least one processor;
wherein the at least one processor is further constructed and arranged to transmit to the at least one display information about the at least one profile; receive from the at least one input device a selected profile selected from the at least one profile; and adjust the at least one operational parameter based on the selected profile.

25. The computer of claim 15, further comprising:
at least one display in communication with the at least one processor;

wherein the at least one processor is further constructed and arranged to transmit to the at least one display information about the at least one profile; receive from the at least one peripheral device a selected profile selected from the at least one profile; and adjust the at least one operational parameter based on the selected profile.

26. The computer of claim 15, wherein the at least one processor is further constructed and arranged to select a specific profile from a plurality of profiles in the at least one database; and adjust the at least one operational parameter based on the specific profile.

27. The computer of claim 15, wherein the at least one processor is further constructed and arranged to transmit data to the at least one peripheral device.

28. The computer of claim 15, further comprising:
   at least one power supply in communication with the at least one processor;
   wherein the at least one peripheral device further comprises at least one peripheral power supply; and
   wherein the at least one processor is further constructed and arranged to establish at least one electrical connection between the at least one power supply in communication with the at least one processor and the at least one peripheral power supply.

29. The computer of claim 15, wherein the at least one operational parameter comprises at least one clock speed of the at least one processor, at least one secondary clock speed for at least one secondary processor, at least one utilization of at least one memory, at least one utilization of at least one storage, at least one orientation of at least one display, at least one display mode of the at least one display, and/or at least one power setting of at least one power supply.

30. The computer of claim 15, wherein the peripheral device data further comprises at least one sensor reading from at least one sensor disposed in the at least one peripheral device, at least one hardware identity of the at least one peripheral device, and/or at least one communication port type.

31. The computer of claim 15, wherein the at least one peripheral device comprises at least one game controller; at least one camera; at least one keyboard; at least one control panel; at least one vehicle; at least one global positioning system receiver; and/or at least one memory device.

32. The computer of claim 15, further comprising:
   at least one housing containing the at least one processor; and
   at least one retention structure disposed on the at least one housing and disposed adjacent to and separate from at least one of the communication ports constructed and arranged to interface with the at least one peripheral device.

33. The computer of claim 32, wherein the at least one retention structure is constructed and arranged to attach the at least one peripheral device to the at least one housing.

34. The computer of claim 32, wherein the at least one peripheral device comprises at least one peripheral retention structure constructed and arranged to interface with the at least one retention structure.

35. The computer of claim 34, wherein:
   the at least one retention structure and the at least one peripheral retention structure are constructed of electrically conductive material; and
   the at least one retention structure and the at least one peripheral retention structure are constructed and arranged to facilitate communication and/or power transfer between the at least one processor and the at least one peripheral device.

36. The computer of claim 15, wherein the at least one processor is constructed and arranged to adjust the at least one operational parameter further based upon to which of the plurality of communication ports two or more of the peripheral devices are connected.

* * * * *